(12) United States Patent
Ji et al.

(10) Patent No.: US 12,167,115 B2
(45) Date of Patent: Dec. 10, 2024

(54) ELECTRONIC DEVICE INCLUDING CAMERA MODULE AND METHOD FOR OPERATING THE ELECTRONIC DEVICE

(71) Applicant: Samsung Electronics Co., Ltd., Gyeonggi-do (KR)

(72) Inventors: Youngmin Ji, Gyeonggi-do (KR); Jinwoo Kim, Gyeonggi-do (KR); Youngseong Kim, Gyeonggi-do (KR); Myunghoon Kwak, Gyeonggi-do (KR); Raetae Kim, Gyeonggi-do (KR); Changryong Heo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 99 days.

(21) Appl. No.: 17/939,552

(22) Filed: Sep. 7, 2022

(65) Prior Publication Data
US 2023/0007149 A1 Jan. 5, 2023

Related U.S. Application Data

(63) Continuation of application No. PCT/KR2021/015069, filed on Oct. 26, 2021.

(30) Foreign Application Priority Data

Nov. 6, 2020 (KR) .................. 10-2020-0148009
Feb. 24, 2021 (KR) .................. 10-2021-0024915

(51) Int. Cl.
*H04N 23/55* (2023.01)
*G06F 1/16* (2006.01)
(Continued)

(52) U.S. Cl.
CPC .......... *H04N 23/55* (2023.01); *G06F 1/1624* (2013.01); *G06F 1/1652* (2013.01); *H04M 1/0264* (2013.01); *H04N 23/69* (2023.01)

(58) Field of Classification Search
CPC ........ H04N 23/55; H04N 23/69; H04N 23/54; H04N 23/57; H04N 23/51; G06F 1/1624;
(Continued)

(56) References Cited

U.S. PATENT DOCUMENTS

2012/0127587 A1  5/2012  Yakita
2018/0035031 A1  2/2018  Kwak et al.
(Continued)

FOREIGN PATENT DOCUMENTS

CN     111474809      7/2020
EP     3 531 230      8/2019
(Continued)

OTHER PUBLICATIONS

European Search Report dated Dec. 12, 2023 issued in counterpart application No. 21889446.7-1208, 10 pages.
(Continued)

*Primary Examiner* — Yogesh K Aggarwal
(74) *Attorney, Agent, or Firm* — The Farrell Law Firm, P.C.

(57) ABSTRACT

An electronic device is provided that includes a first housing, a second housing coupled to the first housing in a movable manner, a flexible display disposed on the first housing and the second housing and having a structure that is changeable with a movement of the second housing, a camera module in which an optical magnification can be set, and a processor. The camera module includes a first camera holder connected to the first housing and including a first lens module disposed along a first optical axis, and a second camera holder connected to the second housing and including at least a second lens module disposed along the first optical axis. The second camera holder is movable along the first optical axis with respect to the first camera holder with the movement of the second housing.

20 Claims, 31 Drawing Sheets

(51) Int. Cl.
  *H04M 1/02* (2006.01)
  *H04N 23/69* (2023.01)

(58) Field of Classification Search
  CPC ......... G06F 1/1652; G06F 2203/04806; G06F 1/1677; G06F 1/1686; G06F 3/04847; G06F 3/0488; H04M 1/0264; H04M 1/0235; H04M 1/0241; G09F 9/30
  See application file for complete search history.

(56) References Cited

U.S. PATENT DOCUMENTS

| | | |
|---|---|---|
| 2018/0367714 A1 | 12/2018 | Im et al. |
| 2019/0028721 A1* | 1/2019 | Rutschman ............ G02B 13/02 |
| 2019/0253542 A1 | 8/2019 | Fan et al. |
| 2019/0261519 A1* | 8/2019 | Park ...................... G06F 1/1677 |
| 2019/0268455 A1 | 8/2019 | Baek et al. |
| 2020/0084308 A1 | 3/2020 | Yoon et al. |
| 2020/0267247 A1 | 8/2020 | Song et al. |
| 2021/0149558 A1* | 5/2021 | Qian ................... G06F 3/04845 |
| 2021/0217133 A1 | 7/2021 | Jeong et al. |
| 2021/0263552 A1 | 8/2021 | Kim et al. |
| 2023/0028213 A1* | 1/2023 | Yang .................. H04M 1/0268 |

FOREIGN PATENT DOCUMENTS

| | | |
|---|---|---|
| JP | 3563052 | 9/2004 |
| JP | 2012-113082 | 6/2012 |
| KR | 10-2004-0110872 | 12/2004 |
| KR | 10-2017-0058816 | 5/2017 |
| KR | 10-2018-0012688 | 2/2018 |
| KR | 10-2018-0041040 | 4/2018 |
| KR | 10-2019-0101605 | 9/2019 |
| KR | 10-2020-0117741 | 10/2020 |
| WO | WO 2016/208812 | 12/2016 |
| WO | WO 2019/164315 | 8/2019 |

OTHER PUBLICATIONS

PCT/ISA/210 Search Report issued on PCT/KR2021/015069, Feb. 16, 2022, pp. 5.
PCT/ISA/237 Written Opinion issued on PCT/KR2020/015069, Feb. 16, 2022, pp. 3.

* cited by examiner (26-1) (26-2) (26-3)

ELECTRONIC DEVICE INCLUDING CAMERA MODULE AND METHOD FOR OPERATING THE ELECTRONIC DEVICE

CROSS-REFERENCE TO RELATED APPLICATION(S)

This application is a bypass continuation application of International Application No. PCT/KR2021/015069, which was filed on Oct. 26, 2021, and is based on and claims priority under 35 U.S.C. § 119 to Korean Patent Application Nos. 10-2020-0148009 and 10-2021-0024915, which were filed in the Korean Intellectual Property Office on Nov. 6, 2020 and Feb. 24, 2021, respectively, the entire disclosure of each of which is incorporated herein by reference.

BACKGROUND

1. Field

The disclosure relates generally to a method for changing a structure of a camera module of an electronic device, and more particularly, to a method for changing a structure of the camera module with a change in a structure of the electronic device.

2. Description of Related Art

Various types of electronic devices are under development that are bendable, foldable, or slidable with a plurality of housings.

A camera module is included in the various types of electronic devices. Since camera modules having many fields of view are provided in the electronic devices, the users can obtain images of various fields of view.

The structure of a camera module does not change even if the structure of an electronic device changes, which may make it difficult to change a focal distance or an optical magnification. For example, it is difficult for a lens of the camera module to move due to a space provided within the module. Therefore, when the camera module does not change in size even if the electronic device increases in size, it may be difficult to change the focal distance or the optical magnification.

For example, for a slidable electronic device, the electronic device increases in size with a movement of a housing of the electronic device. Therefore, even if a display area visible from the outside is extended, a space resulting from the extension cannot be used by the camera module.

SUMMARY

A camera module may be connected to each housing of an electronic device, and a structure of the camera module may change together with a change in a structure of the electronic device.

In accordance with an aspect of the disclosure, an electronic device is provided that includes a first housing, and a second housing coupled to the first housing in a movable manner with respect to the first housing. The electronic device also includes a flexible display disposed on the first housing and the second housing, and having a structure that is changeable with a movement of the second housing. The electronic device also includes a camera module in which an optical magnification can be set, and a processor electrically coupled to the flexible display and the camera module. The camera module includes a first camera holder connected to the first housing and including a first lens module disposed along a first optical axis, and a second camera holder connected to the second housing and including at least a second lens module disposed along the first optical axis. The second camera holder is movable along the first optical axis with respect to the first camera holder with the movement of the second housing. The processor is configured to identify the movement of the second housing, identify an arrangement state of lens modules that satisfies the identified movement of the second housing and the optical magnification, and move the first lens module and the second lens module to be in the identified arrangement state.

In accordance with an aspect of the disclosure, an electronic device is provided that includes a first housing, and a second housing coupled to the first housing in a movable manner with respect to the first housing. The electronic device also includes a flexible display disposed on the first housing and the second housing. A size of an exposed area of the flexible display that is visible from a front face of the electronic device is capable of being changed with a movement of the second housing. The electronic device further includes a camera module in which an optical magnification can be set. The camera module includes a first camera holder connected to the first housing and including a first lens module disposed along a first optical axis, and a second camera holder connected to the second housing and including at least a second lens module disposed along the first optical axis. The second camera holder is movable along the first optical axis with respect to the first camera holder with the movement of the second housing. The electronic device also includes a processor electrically coupled with the flexible display and the camera module. The processor is configured to identify a size of the exposed area of the flexible display, identify a first position corresponding to a current position of the second lens module and third lens module, identify a second position at which the second lens module and the third lens module satisfy a set optical magnification of the camera module, and move the second lens module and third lens module to the second position.

Since a camera module included in an electronic device changes in structure together with a change in a structure of the electronic device, an existing unused space may be utilized, and the electronic device may have an adaptive structure.

A length of the camera module may increase as a length of the electronic device increases, thereby further increasing a movement range of lenses disposed inside the camera module.

Since the electronic device identifies the length of the camera module, which is dependent on an extension of the display, a position of lenses corresponding to the changed length of the camera module may be adjusted based on optical magnification and focus.

Advantageous effects that can be obtained in the disclosure are not limited to the aforementioned advantageous effects, and other advantageous effects can be clearly understood by one of ordinary skill in the art to which the disclosure pertains from the description below.

BRIEF DESCRIPTION OF THE DRAWINGS

The above and other aspects, features, and advantages of certain embodiments of the disclosure will be more apparent from the following description taken in conjunctions with the accompanying drawings, in which.

DETAILED DESCRIPTION

Figure 1:
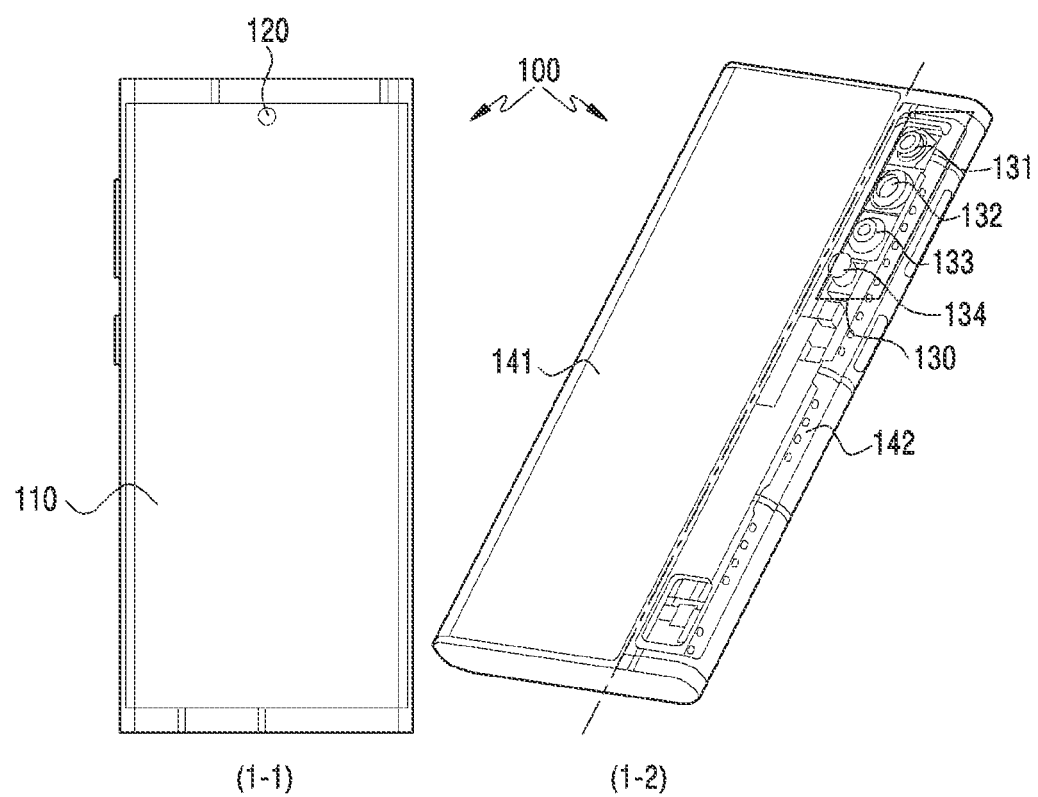
FIG. 1 is a diagram illustrating a front face and rear face of an electronic device, according to an embodiment.

The disclosure may have various embodiments, and various modifications and changes may be made to the embodiments of the disclosure. Hereinafter, some of the embodiments will be described in detail with reference to the accompanying drawings. However, this is not intended to limit the disclosure to particular embodiments, and it should be appreciated that the disclosure includes all changes, equivalents, or alternatives falling within the technical idea and scope of the disclosure.

With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. The terms including an ordinal number, such as expressions "a first" and "a second" may be used to describe various elements, but the corresponding elements should not be limited by such terms. These terms are used merely to distinguish between one element and any other element. For example, a first element may be termed a second element, and similarly, a second element may be termed a first element without departing from the scope of the disclosure. The term "and/or" includes any combination of a plurality of relevant items or nay one of the plurality of relevant items. When an element (e.g., first element) is referred to, with or without the term "operatively" or "communicatively", as "coupled with," "coupled to," "connected with," or "connected to" another element (e.g., second element), it means that the element may be coupled or connected to or with the other element directly (e.g., wiredly), wirelessly, or via a third element.

The terms used in the disclosure are only used to describe specific embodiments, and are not intended to limit the disclosure. A singular expression may include a plural expression unless they are definitely different in a context. In the disclosure, it should be appreciated that the expression "include" or "have" is intended to refer to the existence of a corresponding feature, numeral, step, operation, constituent element, component, or a combination thereof, and does not exclude the existence or addition of one or more other features, numerals, steps, operations, constituent elements, components, or a combination thereof.

Unless defined otherwise, all terms used herein, including technical and scientific terms, have the same meaning as those commonly understood by a person skilled in the art to which the disclosure pertains. Such terms as those defined in a generally used dictionary should be interpreted to have the meanings equal to the contextual meanings in the relevant field of art, and are not to be interpreted to have ideal or excessively formal meanings unless clearly defined in the disclosure.

In the disclosure, the electronic device may be any device including a touch panel, and the electronic device may be referred to as a terminal, a portable terminal, a mobile terminal, a communication terminal, a portable communication terminal, a portable mobile terminal, or a display device.

For example, the electronic device may include a smartphone, a mobile phone, a navigation device, a game console, a TV, an in-vehicle head unit, a notebook computer, a laptop computer, a tablet computer, a personal media player (PMP), or a personal digital assistant (PDA). The electronic device may be implemented as a pocket-sized portable communication terminal having a wireless communication function. In addition, the electronic device may be a flexible device or a flexible display device.

The electronic device may communicate with an external electronic device, such as a server, or may perform a task through interworking with an external electronic device. For example, the electronic device may transmit an image captured using a camera and/or location information detected by a sensor unit to a server through a network. The network may be, but is not limited to, a mobile or cellular network, a local area network (LAN), a wireless local area network (WLAN), a wide area network (WAN), the Internet, or a small area network (SAN).

FIG. 1 is a diagram illustrating a front face and rear face of an electronic device, according to an embodiment.

1-1 of FIG. 1 illustrates a front face of an electronic device 100.

The electronic device 100, according to 1-1, is in a state in which an area, in which a display 110 is exposed to the outside, is not extended.

At least part of the display 110 may be exposed to the front face of the electronic device 100. For example, the display 110 may be a flexible display, or may be bendable or foldable.

The electronic device 100 has a front camera 120 disposed on the front face. The front camera 120 may obtain an image in a front direction of the electronic device 100. The front camera 120 may be disposed between the display 110 of the electronic device 100 and the rear face of the electronic device 100.

At least part of the display 110 exposed to the front face of the electronic device 100 is disposed on a first housing 141. At least part of the display 110 is also disposed on a second housing 142.

1-2 of FIG. 1 illustrates the rear face of the electronic device.

The first housing 141 is a fixed housing, and the second housing 142 is coupled or connected to the first housing 141 in a movable manner with respect to the first housing 141.

The display 110 is disposed on the first housing 141 and the second housing 142, and an exposed area, which is visible from outside of the electronic device 100, may be enlarged or reduced with a movement of the second housing 142.

A camera area 130, in which camera modules are disposed, exist in the second housing 142. For example, a first camera module 131, a second camera module 132, a third camera module 133, and/or a fourth camera module 134 are disposed in the camera area 130. The first camera module 131 may include an ultra-wide-angle camera, the second camera module 132 may include a wide-angle camera, the third camera module 133 may include a telephoto camera, and the fourth camera module 134 may include an infrared (IR) light emitting unit and a time-of-flight (TOF) sensor as a depth camera. The camera modules disposed in the camera area 130 and a type of the included camera are for exemplary purposes only, and the disclosure is not limited thereto.

Images in a rear direction of the electronic device 100 may be obtained through camera modules disposed in the camera area 130 of the rear face of the electronic device 100.

Figure 2:
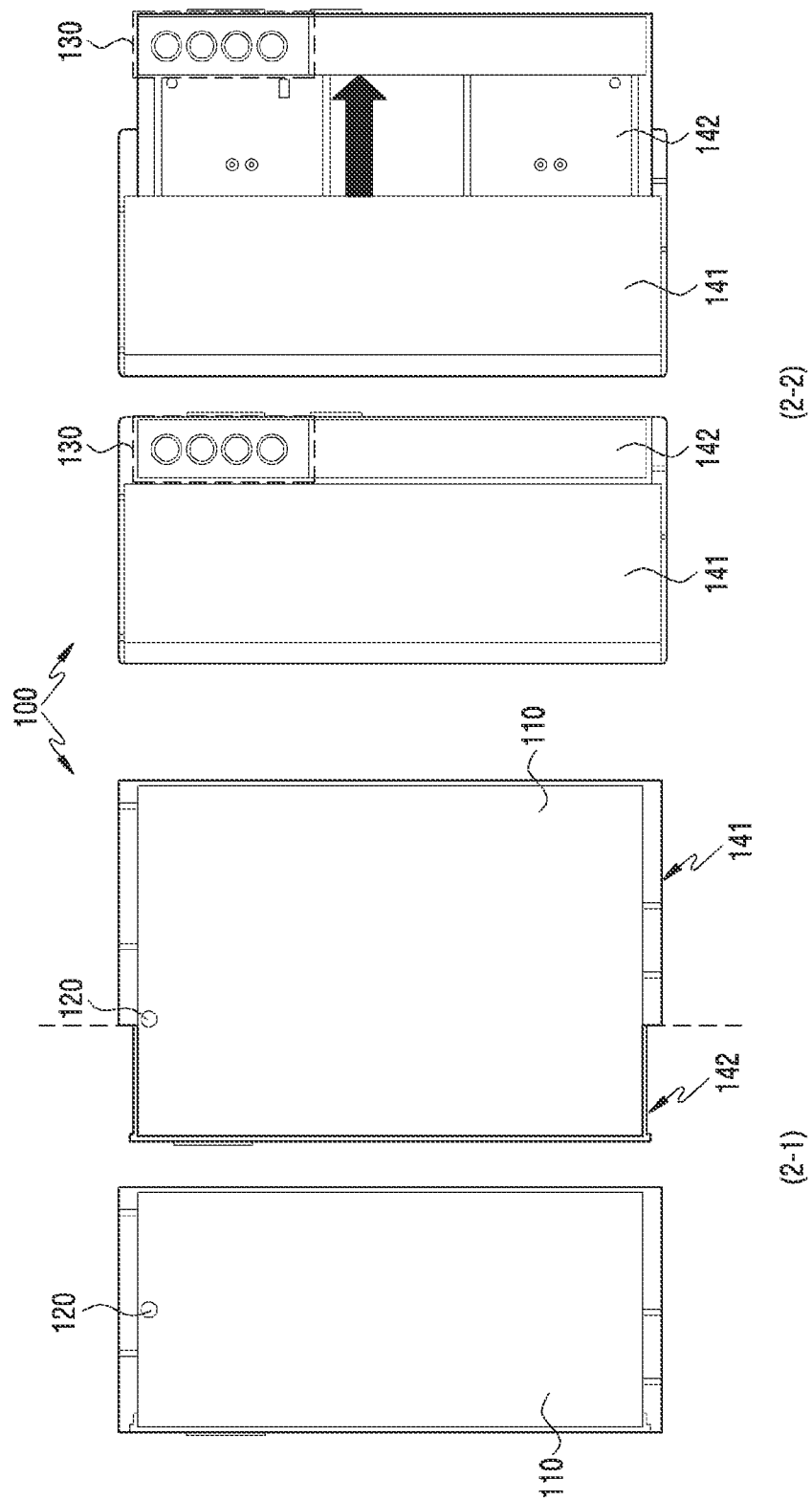
FIG. 2 is a diagram illustrating a change in a size of an exposed area in which a display is visible from the outside with an extension of the display of an electronic device, according to an embodiment.

FIG. 2 is a diagram illustrating a change in a size of an exposed area, in which a display is visible from the outside, with an extension of the display of an electronic device, according to an embodiment of the disclosure.

The exposed area may be an area in which the display 110 is visible from the outside of the electronic device 100 (or a visually exposed area). For example, the display 110 may be included inside the electronic device 100, and at least part of the display 110 may be visible as the exposed area from the outside of the electronic device 100.

2-1 of FIG. 2 illustrates extension of the display 110 of the electronic device 100.

2-1 of FIG. 2 illustrates the front face of the electronic device 100.

The electronic device 100 includes the fixed first housing 141 and the second housing 142 movable with respect to the first housing 141. An area (or an exposed area) in which the display 110 is visible from the outside may be changed (enlarged or reduced) with a movement of the second housing 142 with respect to the first housing 141.

2-2 of FIG. 2 illustrates the rear face of the electronic device 100.

The camera area 130 is within the second housing 142. For example, at least one camera module may be included in the camera area 130.

At least one of a plurality of camera modules (e.g., the first camera module 131, the second camera module 132, the third camera module 133, and the fourth camera module 134) may be connected to both the first housing 141 and the second housing 142. For example, the third camera module 133 may be connected to the first housing 141 and the second housing 142, and at least part of the third camera module 133 may move together with a movement of the second housing 142.

At least one of the plurality of camera modules may be connected to the first housing 141 or the second housing 142. For example, the third camera module 133 may be connected to at least one of the first housing 141 and the second housing 142, and at least part of the third camera module 133 may move by using a power device such as a motor, based on the movement of the first housing 141 and second housing 142. As another example, the third camera module 133 may be connected to at least one of the first housing 141 and the second housing 142, and the third camera module 133 may be coupled to a structure such as a multi-bar, which moves based on a movement of the display 110, so that at least part of the third camera module 133 moves with a movement of the second housing 142.

Figure 3:
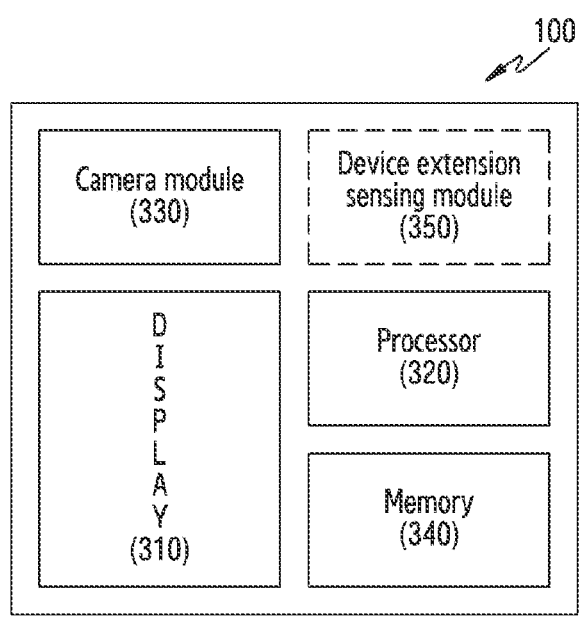
FIG. 3 is a diagram illustrating a structure of an electronic device including a camera module, according to an embodiment.

FIG. 3 is a diagram illustrating a structure of an electronic device including a camera module, according to an embodiment.

The electronic device 100 includes a display 310, a processor 320, a camera module 330, and/or a memory 340.

The display 310 may correspond to the display 110 of FIG. 1, and the camera module 330 may correspond to at least one of the first camera module 131, the second camera module 132, the third camera module 133, and the fourth camera module 134 of FIG. 1.

At least part of the display 310 may be disposed to a front face of the electronic device 100. For example, at least part of the display 310 may be visually exposed to the front face of the electronic device 100, and a size of an area to be exposed (or an exposed area) may vary with an extension of the display 310, which is dependent on a movement of a housing. The display 310 may move together with the movement of the housing (e.g., the second housing 142).

The processor 320 may be electrically coupled to the display 310, the camera module 330, or the memory 340, and may control operations of the display 310, camera module 330, and memory 340.

The camera module 330 may include a plurality of camera modules (e.g., the first camera module 131, the second camera module 132, the third camera module 133, and the fourth camera module 134). For example, the first camera module 131, the second camera module 132, and the third camera module 133 may include cameras (e.g., an ultra-wide-angle camera, a wide-angle camera, or a telephoto camera) each having a different field of view. The fourth camera module 134 may detect a distance of external objects of the electronic device 100.

The aforementioned description on the camera modules (e.g., the first camera module 131, the second camera module 132, the third camera module 133, and the fourth camera module 134) is for exemplary purposes only, and the disclosure is not limited thereto.

The memory 340 may have data stored therein, corresponding to an optical magnification and/or a size of an exposed area of the display 310. For example, data regarding an arrangement state (e.g., arrangement state data) of lenses corresponding to the size of the exposed area of the display 310 and/or the set optical magnification may be stored therein.

The electronic device 100 may further include a device extension sensing module 350. For example, the device extension sensing module 350 may detect a movement of a housing (e.g., the second housing 142) and/or a change in a size of the exposed area of the display 310 with the movement of a housing (e.g., the second housing 142).

The electronic device 100 may detect a change in the exposed area of the display 310 by using the device extension sensing module 350 under the control of the processor 320. For example, the electronic device 100 may detect the enlargement or reduction of the exposed area of the display 310 through the device extension sensing module 350 under the control of the processor 320, thereby obtaining data regarding the size of the exposed area of the display 310 exposed to the front face of the electronic device 100.

The processor 320 of the electronic device 100 may detect the movement of the housing (e.g., the second housing 142) by using the device extension sensing module 350. For example, the device extension sensing module 350 may operate in a magnetic force measurement manner, an electrostatic manner, an optical measurement manner, a physical measurement manner, or a variable resistance manner.

The processor 320 may measure a movement distance of the display 310 in the magnetic force measurement manner in which magnetic force strength and direction are measured depending on a position and displacement of a metal magnetized by utilizing a hall sensor and a magnet. The processor 320 may measure the movement distance of the display 310 in the electrostatic manner in which a change in capacitance is detected by using one or more touch screen panels (TSPs) and a metal structure. The processor 320 may also measure the movement distance of the display 310 in the optical measurement manner in which an amount of IR reflected light or time difference depending on a movement displacement is measured by utilizing an IR light emitting unit, an IR sensor, or a TOF sensor. The processor 320 may measure the movement distance of the display 310 in the physical measurement manner in which the number of times of triggering a switch is measured by utilizing a counter switch. The processor 320 may measure the movement distance of the display 310 in the variable resistance manner in which a value of a change in a variable resistance depending on the movement displacement is measured using ADC data. The movement distance of the display 310 may imply a distance by which the second housing 142 moves with respect to the first housing 141 or a level of changing a size of an exposed area of the display 310 with the movement of the second housing 142 with respect to the first housing 141.

Figure 4:
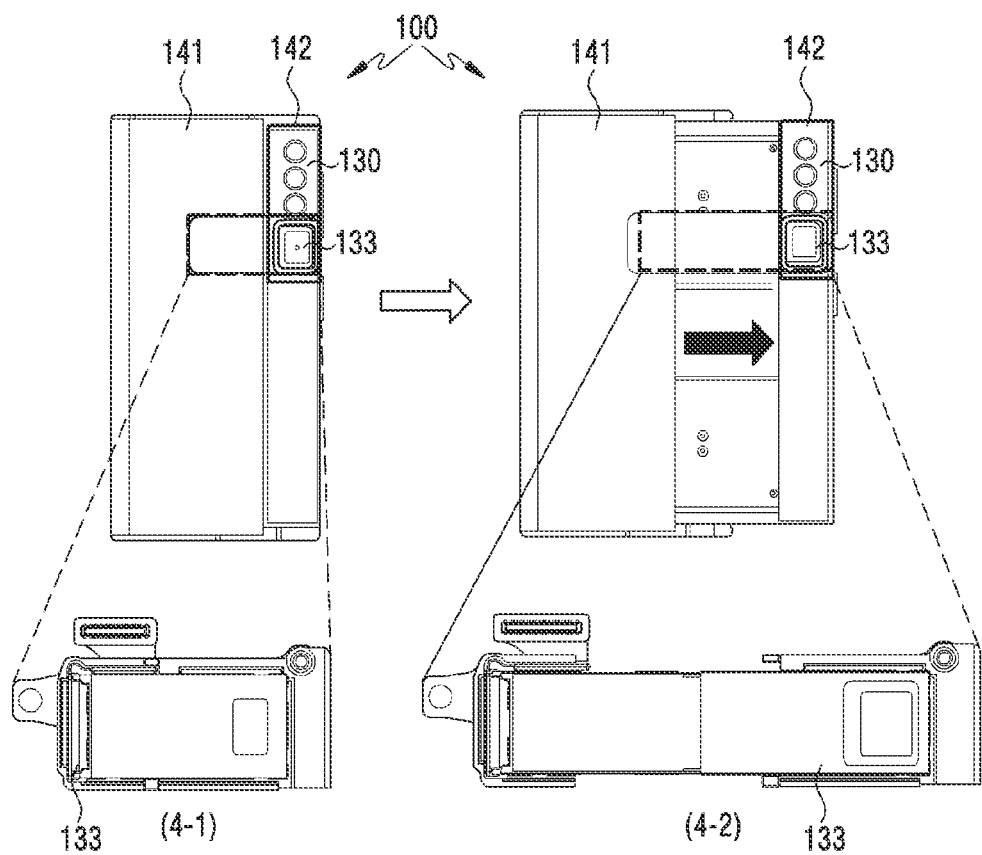
FIG. 4 is a diagram illustrating a structure of a camera module with an extension of a display of an electronic device, according to an embodiment.

FIG. 4 is a diagram illustrating a structure of a camera module with an extension of a display of an electronic device, according to an embodiment.

4-1 of FIG. 4 illustrates a structure in which a display (e.g., the display 110 of FIG. 1, or the display 310 of FIG. 3) of the electronic device 100 is not extended.

In a state in which the second housing 142 does not move with respect to the first housing 141 of the electronic device 100, a size or length of at least one camera module (e.g., the third camera module 133) among camera modules included in the camera module 130 may not be increased.

4-2 of FIG. 4 illustrates a structure in a state in which the display (e.g., the display 110 of FIG. 1, or the display 310 of FIG. 3) of the electronic device 100 is extended.

The order/position of the camera modules illustrated in 4-1 and 4-2 of FIG. 4 is for exemplary purposes only, and the disclosure may not be limited thereto.

In a state in which the second housing 142 moves with respect to the first housing 141 of the electronic device 100, a size or length of at least one camera module (e.g., the third camera module 133) among camera modules included in the camera module 130 is also increased.

Since the second housing 142 moves with respect to the first housing 141, an exposed area of the display is enlarged. The enlargement of the exposed area of the display (e.g., the display 110 of FIG. 1, or the display 310 of FIG. 3) results in an increased area (or exposed area) of the display visible from a front face of the electronic device 100.

Since the second housing 142 moves with respect to the first housing 141, an area in which the display is visible from the outside may be decreased. The reduction of the area in which the display (e.g., the display 110 of FIG. 1, or the display 310 of FIG. 3) is visible from the outside may result in a decrease in the area of the display visible from the front face of the electronic device 100.

One end of at least one camera module (e.g., the third camera module 133) among camera modules included in the camera area 130 is connected to the first housing 141, and the other end is connected to the second housing 142.

Figure 5:
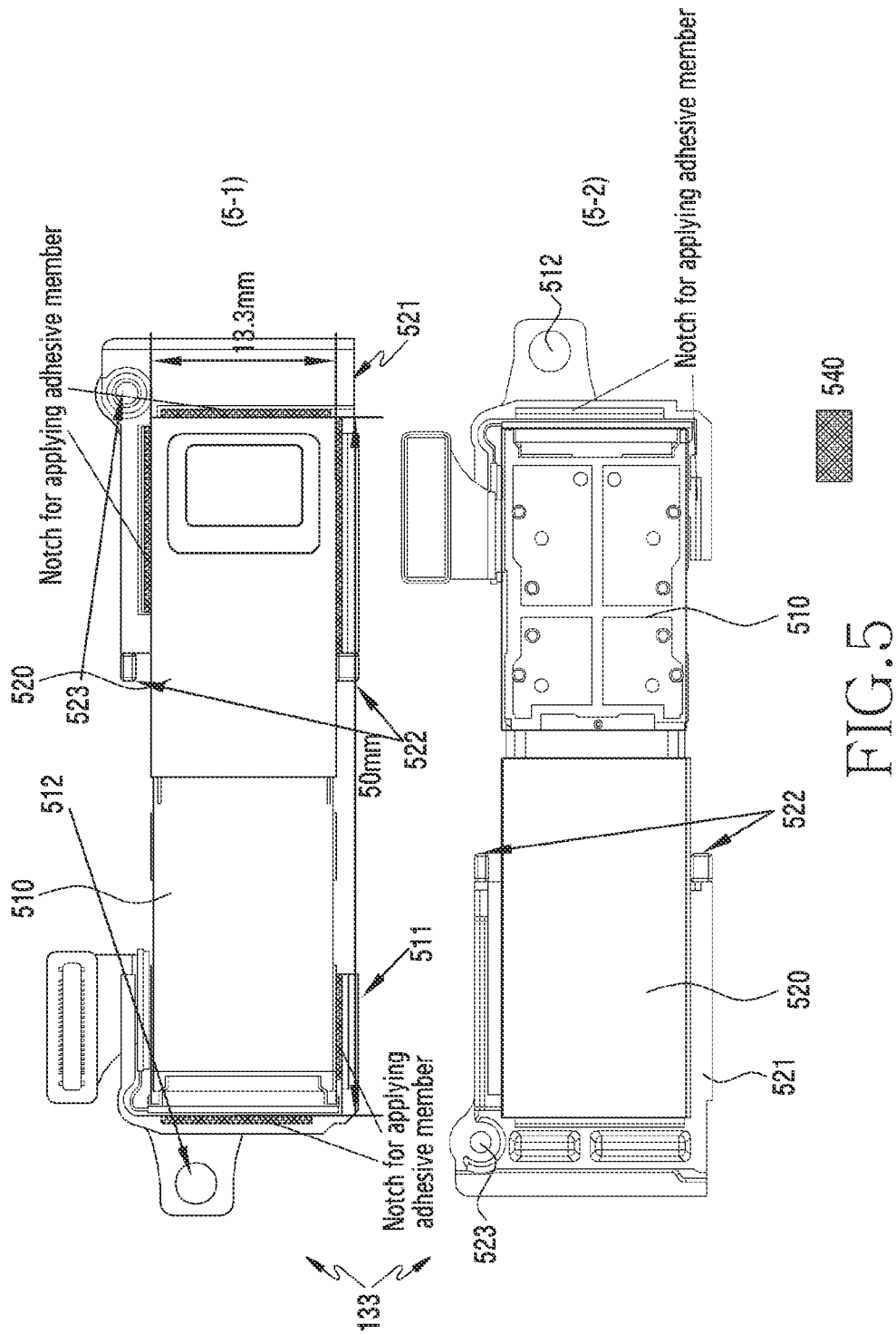
FIG. 5 is a diagram illustrating a structure of a front face and rear face of a camera module, according to an embodiment.
Figure 6:
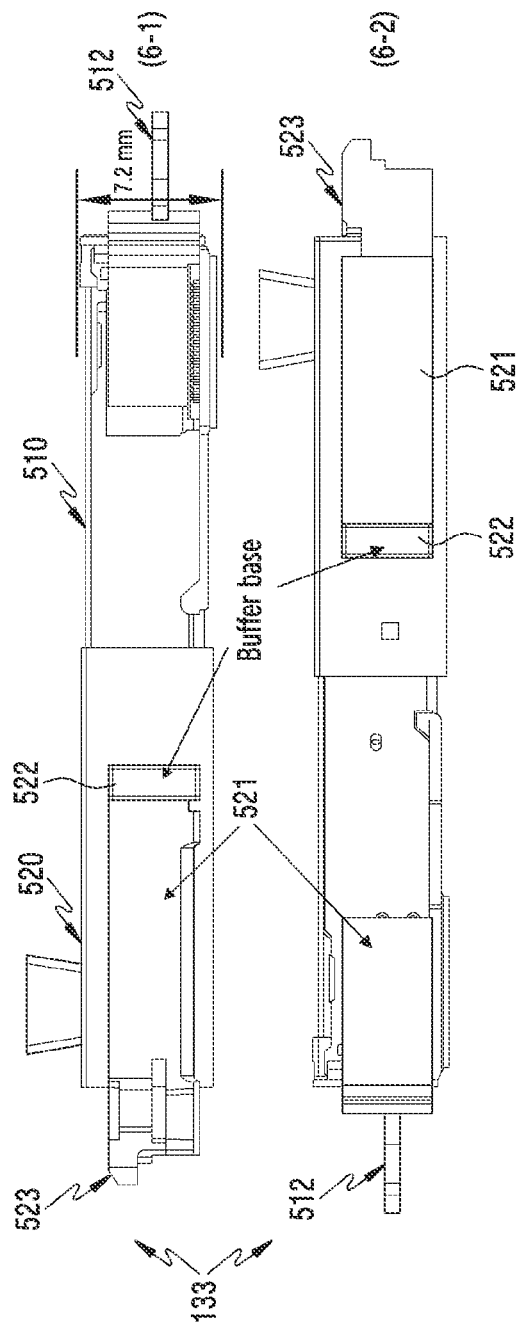
FIG. 6 is a diagram illustrating a structure of a side face of a camera module, according to an embodiment.

FIG. 5 is a diagram illustrating a structure of a front face and a rear face of a camera module, according to an embodiment. FIG. 6 is a diagram illustrating a structure of a side face of a camera module, according to an embodiment.

FIGS. 5 and 6 illustrate a structure of at least one camera module (e.g., the third camera module 133) among camera modules (e.g., the first camera module 131, the second camera module 132, the third camera module 133, and the fourth camera module 134).

The third camera module 133 may be a camera module including a telephoto camera. Hereinafter, a camera structure may be described by taking the third camera module 133 for example. However, the description on the camera structure may also be applied to the first camera module 131 or the second camera module 132.

5-1 of FIG. 5 illustrates the third camera module 133 of which a size or length is increased, viewed from a front side, with an enlargement of an area (or an exposed area) of a display (e.g., the display 110 of FIG. 1, or the display 310 of FIG. 3).

5-2 of FIG. 5 illustrates the third camera module 133 of which a size or length is increased, viewed from a rear face of the camera module 133, with an enlargement of an exposed area of a display).

6-1 and 6-2 of FIG. 6 illustrate the camera module 133 of which a size or length is increased, viewed from a side face, with an enlargement of an exposed area of a display The third camera module 133 includes a first camera holder 510 and a second camera holder 520 coupled to the first camera holder 510 in a movable manner with respect to the first camera holder 510. For example, at least part of the first camera holder 510 and at least part of the second camera holder 520 may be coupled (or connected), and the second camera holder 520 may be coupled to the first camera holder 510 in a movable manner with respect to the first camera holder 510 in a specific distance.

The first camera holder 510 is connected to a first bracket 511. For example, at least part of the first camera holder 510 may be connected to at least part of the first bracket 511, and the first bracket 511 may be connected to the first camera holder 510 by surrounding at least part of the first camera holder 510.

The first bracket 511 may be connected to the first housing 141 through a first connection hole 512. For example, the first bracket 511 may be screwed to the first housing 141 through the first connection hole 512.

The second camera holder 520 is connected to a second bracket 521. For example, at least part of the second camera holder 520 may be connected to at least part of the second bracket 521, and the second bracket 521 may be connected to the second camera holder 520 by surrounding at least part of the second camera holder 520.

The second bracket 521 may be connected to the second housing 142 through a second connection hole 523. For example, the second bracket 521 may be screwed to the second housing 142 through the second connection hole 523.

The second bracket 521 has a buffer base 522 capable of serving as a buffer when in contact with the first bracket 511. For example, when the third camera module 133 is extended or reduced, the buffer base 522 may be disposed to prevent a damage caused by friction or contact between the first bracket 511 and the second bracket 521.

At least one lens and a barrel may be disposed inside the first camera holder 510 and/or the second camera holder 520.

Lenses included in the first camera module 510 and/or the second camera module 520 may be designed to be movable inside the camera holders.

The first camera holder 510 and/or the second camera holder 520 are connected to an adhesive area 540 through an adhesive member (e.g., a bond) in the first bracket 511 and the second bracket 521.

Figure 7:
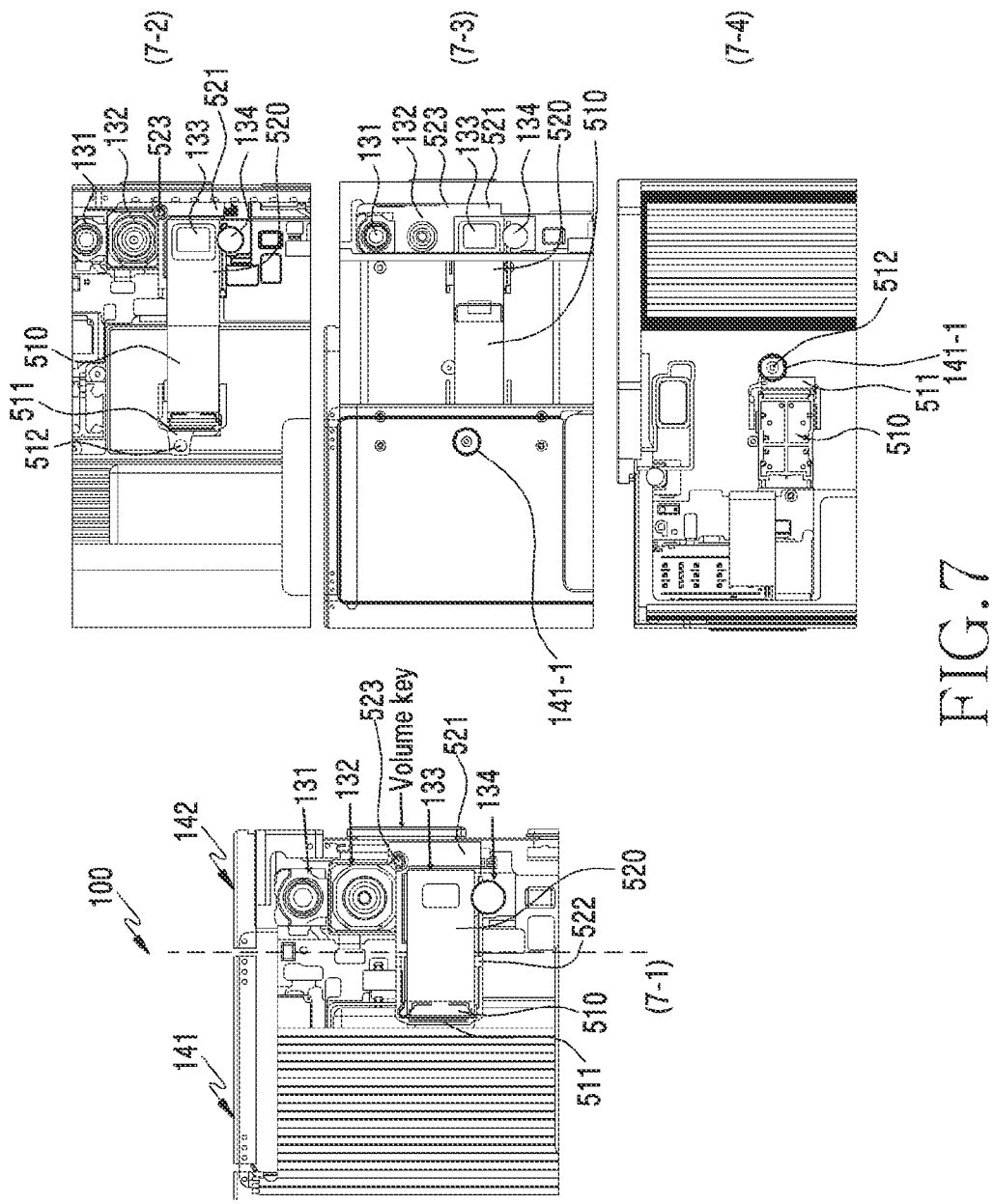
FIG. 7 is a diagram illustrating a camera module disposed in an electronic device, according to an embodiment.

FIG. 7 is a diagram illustrating a camera module disposed in an electronic device, according to an embodiment.

7-1 of FIG. 7 illustrates a state in which the third camera module 133 is not extended and is connected to the electronic device 100.

The electronic device 100 includes the first housing 141 and the second housing 142, and the second housing 142 is movable with respect to the first housing 141.

The second housing 142 has the first camera module 131, the second camera module 132, and the third camera module 133 disposed thereon, which are cameras having different field of views, and has the fourth camera module 134 disposed thereon to detect a distance to a subject.

The third camera module 133 is connected to the first housing 141 and the second housing 142. For example, the first bracket 511 is adhered or fixed to the first camera holder 510 of the third camera module 133, and the first bracket 511 is screwed to the first housing 141 through the first connection hole 512. As another example, the third camera module 133 may be connected to a structure, such as a support structure, included in the first housing 141 or second housing 142. The second bracket 521 is adhered or fixed to the second camera holder 520 of the third camera module 133, and the second bracket 521 is screwed to the second housing 142 through the second connection hole 523. The third camera module 133 is connected to the first housing 141 and the second housing 142 by connecting a bracket (e.g., the first bracket 511 or the second bracket 521) and a housing (e.g., the first housing 141 or the second housing 142).

Although it is described that the third camera module 133 is connected to the first housing 141 or the second housing 142 by using a screw, the disclosure is not limited thereto. For example, the third camera module 133 may be connected to the first housing 141 or the second housing 142 through an adhesive member such as a double-sided tape or an adhesive. As another example, the third camera module 133 may be connected to the first housing 141 or the second housing 142 in an engagement manner through a structural design. In addition, the third camera module 133 may be connected to the first housing 141 or the second housing 142 through a coupling member. In this case, the first connection hole 512 or the second connection hole 523 may be omitted.

In 7-1, since the second housing 142 of the electronic device 100 is not moved with respect to the first housing 141, the third camera module 133 may be extended, and a size or length of the third camera module 133 is not increased.

7-2 of FIG. 7 illustrates the third camera module 133 in an extended state and connected to the electronic device 101, viewed from a rear face.

In the state of 7-2, since the second housing 142 of the electronic device 100 moves in a direction away from the first housing 141 with respect to the first housing 141, the third camera module 133 is extended, and the size or length of the third camera module 133 is increased. For example, in this state, a length constructed by the first camera holder 510 and the second camera holder 520 may be increased.

The first bracket 511 fixed to the third camera module 133 is connected to at least part of the first housing 141 through the first connection hole 152, and the second bracket 512 is connected to at least part of the second housing 142 through the second connection hole 523.

The second housing 142 moves with respect to the first housing 141, so that the second bracket 512 connected to the second housing 142 may also move in a connected state. Since the first bracket 511 is fixed to the first housing 141 and the second bracket 512 moves, the second camera holder 520 moves in a direction in which the second bracket 512 moves with respect to the first camera holder 510.

7-3 of FIG. 7 illustrates the third camera module 133 in the extended state and connected to a fastening hole 141-1 of the first housing 141 of the electronic device 100, viewed from the rear face. 7-4 of FIG. 7 illustrates the third camera module 133 in the extended state and connected to the fastening hole 141-1 of the first housing 141, viewed from the front face of the electronic device 100.

The first connection hole 512 of the first bracket 511 of the third camera module 133 is connected by being screwed through the first fastening hole 141-1 constructed at the first housing 141.

Since the first bracket 511 is screwed through the first connection hole 512 and the fastening hole 141-1, the first bracket 511 may be fixed to at least part of the first housing 141.

Figure 8:
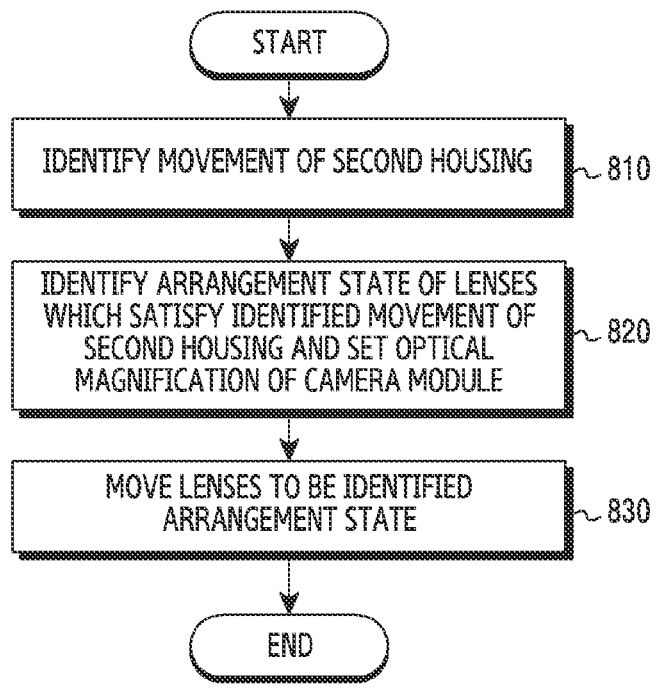
FIG. 8 is a flowchart illustrating a method in which an electronic device identifies a change in an area visible from the outside of a display, and changes an arrangement state of lenses corresponding to a changed structure of a camera module, according to an embodiment.

FIG. 8 is a flowchart illustrating a method in which an electronic device identifies a change in an area visible from the outside of a display, and changes an arrangement state of lenses corresponding to a changed structure of a camera module, according to an embodiment.

In the flowchart of FIG. 8, a concept in which the electronic device changes the arrangement state of the lenses is described with reference to FIG. 9.

In 810, the electronic device 100 identifies a size of an area visible from the outside of the display 310.

The display may also move together with a movement of a second housing (e.g., the second housing 142) with respect to a first housing (e.g., the first housing 141). For example, when at least part of the second housing 142 moves (e.g., is drawn out) with respect to the first housing 141 in a direction in which the display 310 is extended, an area (or an exposed area) visible from the outside of the display 310 may be widened. When at least part of the second housing 142 moves (e.g., is inserted) with respect to the first housing 141 in a direction in which the display 310 is reduced, the area (or the exposed area) visible from the outside of the display 310 may be reduced. As another example, although at least part of the second housing 142 is inserted to the first housing 141 in the structure of FIG. 7, it may also be implemented with a structure in which at least part of the first housing 141 is inserted to the second housing 142.

The electronic device 100 may identify the size of the area visible from the outside of the display 310 under the control of the processor 320. For example, the processor 320 of the electronic device 100 may identify the size of the exposed area of the display 310 corresponding to a level of extending the display 310. For example, the size of the exposed area of the display 310 may be a size of the display 310 visible from the front face of the electronic device 100.

When at least part of the display 310 located inside the first housing 141 or the second housing 142 is moved to the outside of the first housing 141 or the second housing 142, the processor 320 of the electronic device 100 may identify that the size of the exposed area of the display 310 increases. When at least part of the display 310 located outside the first housing 141 or the second housing 142 is moved to the inside of the first housing 141 or the second housing 142, the processor 320 of the electronic device 100 may identify that the size of the exposed area of the display 310 decreases.

The processor 320 of the electronic device 100 may identify the size of the exposed area of the display 310 by using the device extension sensing module 350.

Referring back to FIG. 8, in 820, the electronic device 100 identifies an arrangement state of lenses which satisfy the detected size of the exposed area of the display 310 and a set optical magnification of the camera module.

The electronic device 100 may identify an optical magnification of the camera module 330, under the control of the processor 320. For example, the optical magnification of the camera module 330 may be an optical magnification which is set by user input. As another example, the optical magnification of the camera module 330 may vary depending on the user input in an operation in which the display 310 moves. As another example, the optical magnification of the camera module 330 may be determined based on a movement distance of the camera module 330 disposed to the second housing 142 with respect to the first housing 141. For example, the optical magnification may increase in proportion to the movement distance of the camera module 330 disposed to the second housing 142. The movement distance of the camera module 330 may imply a level of extending the camera module 330.

Under the control of the processor 320, the electronic device 100 may identify the arrangement state of lenses which satisfy the identified size of the exposed area of the display 310 and/or optical magnification of the camera module 330.

Figure 9:
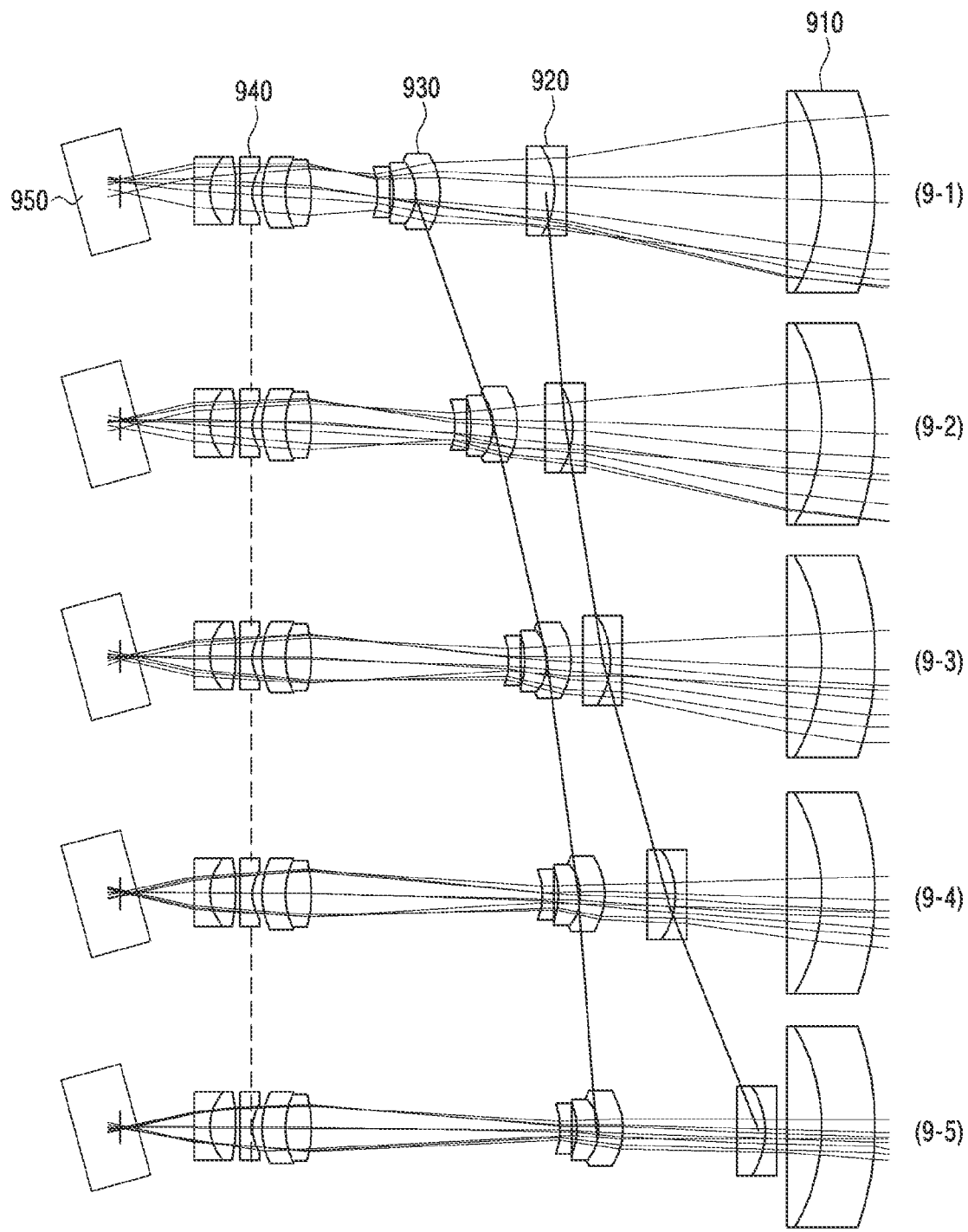
FIG. 9 is a diagram illustrating an electronic device changing an arrangement state of lenses, according to an embodiment.

Referring to FIGS. 9, 9-1 to 9-5 illustrate arrangement states of lenses that satisfy a set optical magnification, when the size of the exposed area of the display 310 is constant.

A first lens module 910, a second lens module 920, a third lens module 930, a fourth lens module 940, and an image sensor 950 are arranged along an optical axis. For example, light incident to the electronic device 100 may be incident to the image sensor 950 via the first lens module 910, the second lens module 920, the third lens module 930, and the fourth lens module 940.

The set optical magnification of the camera module 330 may be higher as the sub-figure number increases from 9-1 to 9-5. For example, a magnification of 9-2 may be higher than that of 9-1.

Under the control of the processor 320, the electronic device 100 may identify the arrangement state of lenses which satisfy the optical magnification of the camera module 330. For example, the processor 320 of the electronic device 100 may identify the size of the exposed area of the display 310 and the arrangement state of lenses that satisfies the optical magnification as shown in 9-1 to 9-5 of FIG. 9.

The size of the exposed area of the display 310 and the arrangement state of lenses which satisfies the optical magnification, which are identified by the processor 320 of the electronic device 100, may be stored in the memory 340 in a table form, based on a simulation.

Referring back to FIG. 8, in 830, the electronic device (e.g., the electronic device 100) moves lens modules to be in the identified arrangement state.

The processor 320 of the electronic device 100 may move current lenses to be in the arrangement state of lenses identified in 820.

The aforementioned arrangement and/or number of the first lens module 910, second lens module 920, third lens module 930, fourth lens module 940, and/or image sensor 950 are for exemplary purposes only, and the disclosure is not limited thereto. The lens modules (e.g., the first lens module 910, the second lens module 920, the third lens module 930, and the fourth lens module 940) may include at least one lens.

Figure 10:
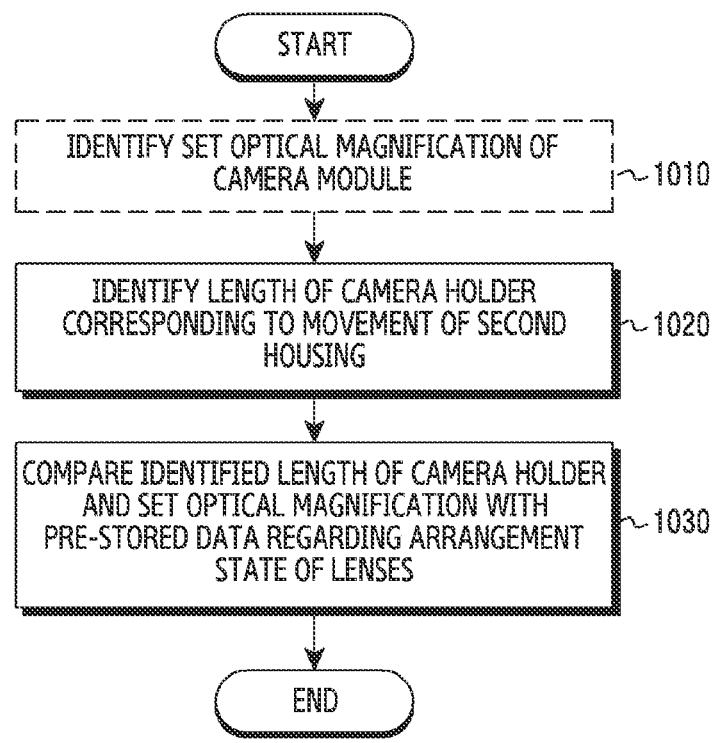
FIG. 10 is a flowchart illustrating a method in which an electronic device identifies an optical magnification and a changed length of a camera holder and compares the identified result with pre-stored data, according to an embodiment.

FIG. 10 is a flowchart illustrating a method in which an electronic device identifies an optical magnification and a changed length of a camera holder and compares the identified result with pre-stored data, according to an embodiment.

The flowchart of FIG. 10 is a more detailed description of 810 and 820 of FIG. 8.

In 1010, the electronic device 100 may identify a set optical magnification of the camera module 330 under the control of the processor 320.

The electronic device 100 may identify the optical magnification of the camera module under the control of the processor 320. The optical magnification of the camera module 330 may be a magnification pre-set by a user, or may be a magnification changed by the user while using the electronic device 100.

In 1010, an operation timing is for exemplary purposes only, and the disclosure may not be limited thereto.

In 1020 of FIG. 10, the electronic device 100 identifies a length of a camera holder (e.g., a total length constructed by the first camera holder 510 and the second camera holder 520) corresponding to a size of an exposed area of the display 310, under the control of the processor 320.

The electronic device 100 may detect an extension or reduction of the exposed area of the display 310 with a movement of a second housing (e.g., the second housing 142) with respect to a first housing (e.g., the first housing 141), under the control of the processor 320. The processor 320 may identify the size of the exposed area of the display 310 with the movement of the display 310, and may also identify an extended length of a camera module (or a camera holder) corresponding to the size of the exposed area. The aforementioned length of the camera module may be a total length constructed by, for example, the first camera holder 510 and the second camera holder 520. The electronic device 101 may identify the extended length of the camera module by using a sensor included in the camera module, with the movement of the second housing (e.g., the second housing 142) with respect to the first housing (e.g., the first housing 141).

In 1030 of FIG. 10, the electronic device 100 compares the set optical magnification and the identified length of the camera holder with the stored data regarding the arrangement state of lenses, under the control of the processor 320.

The electronic device 100 may compare data regarding the identified length of the camera holder and the optical magnification with the stored data regarding the arrangement state of lenses, under the control of the processor 320. For example, by comparing with the stored data regarding the arrangement state of lenses and corresponding to the identified length of the camera holder and the arrangement state of lenses, the processor 320 may identify the arrangement of state of lenses that satisfies the identified length of the camera holder and the identified optical magnification.

The processor 320 of the electronic device 100 may identify the arrangement state of lenses which satisfies the identified length of the camera holder and the identified optical magnification, and similar to 830 of FIG. 8, may move lenses included in the camera holder (e.g., the first camera holder 510, or the second camera holder 520) to be in the identified arrangement state.

The lenses may move by using a driving scheme such as a voice coil motor (VCM) or a piezoelectric actuator, and the disclosure is not limited thereto.

The movement of the lenses is described in detail below with reference to the accompanying drawings.

Figure 11:
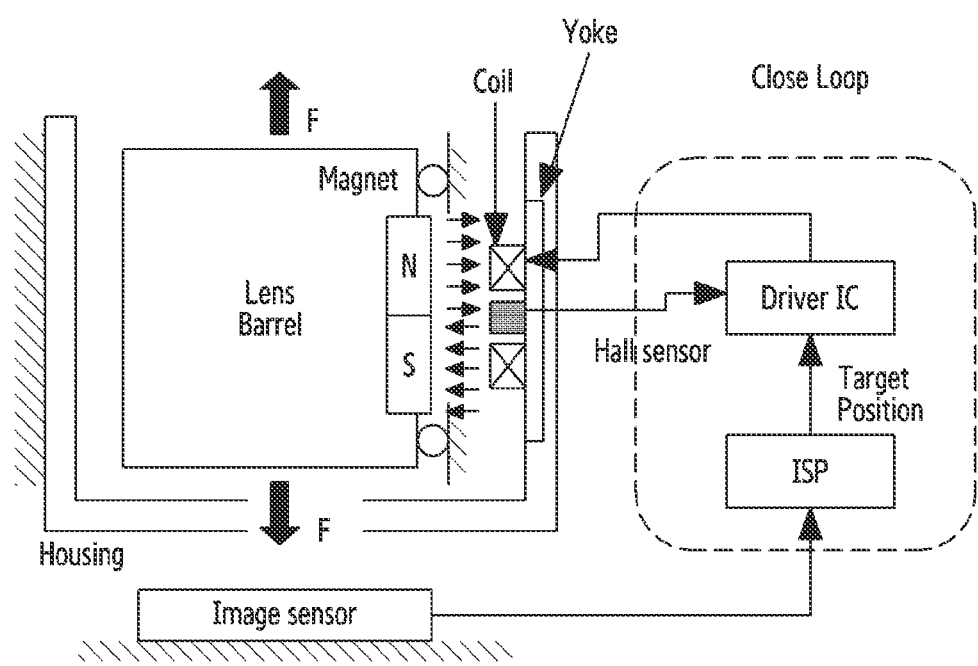
FIG. 11 is a diagram illustrating movement of a lens included in a camera module, according to an embodiment.

FIG. 11 is a diagram illustrating a principle of moving a lens included in a camera module, according to an embodiment.

FIG. 11 illustrates a close loop mechanism of a VCM scheme in the movement of the lenses.

A magnet may be attached to a lens barrel, and a coil may be disposed in a camera holder at a position corresponding to a position of the magnet.

A processor 320 of an electronic device 100 may control a current that flows in the coil, and a position of a lens may be moved by the current that flows in the coil.

The processor 320 of the electronic device 100 may identify the position of the lens through a hall IC sensor. The processor 320 of the electronic device 100 may transfer the identified position of the lens to a driver IC to correct the position of the lens, thereby obtaining an optimized position of lenses.

The electronic device 100 may determine whether it is in focus by using a processor (e.g., the processor 320 or an ISP, based on an image obtained from an image sensor. When it is not accurately in focus, the electronic device 100 may request a driving circuit to move the lens, under the control of the processor 320 or the ISP.

The electronic device 100 may move the lenses by using one or a plurality of coils and a hall sensor.

The aforementioned movement scheme may also apply not only to the movement of the lens but also to the movement of a lens module including the lens or a camera holder.

Figure 12:
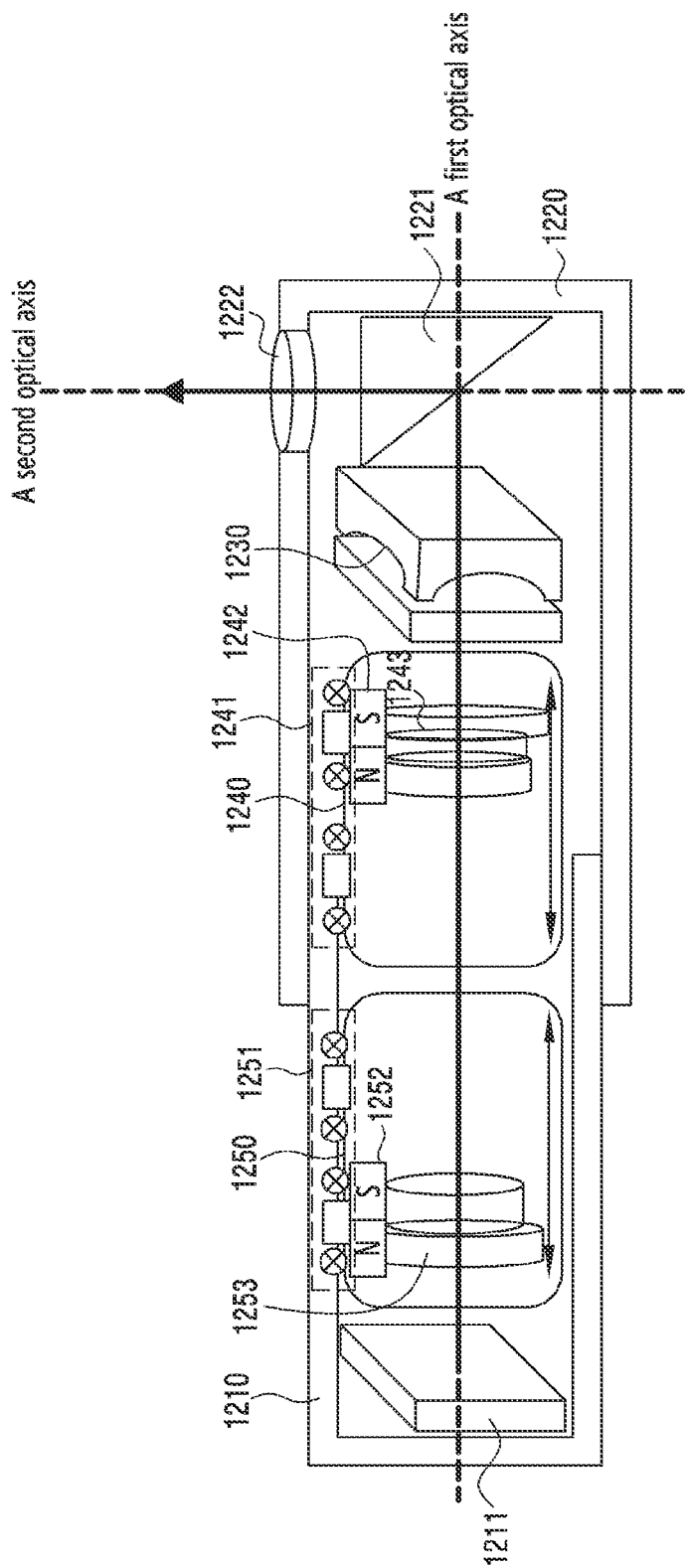
FIG. 12 is a diagram illustrating a change in a length of a camera holder with an extension of a camera module, and a movement of a lens included therein, according to an embodiment of the disclosure.

FIG. 12 is a diagram illustrating a change in a length of a camera holder with an extension of a camera module, and a movement of a lens included therein, according to an embodiment.

The camera module of FIG. 12 may correspond to the camera module of FIG. 5 and FIG. 6, and some constructions may be omitted in the illustration for convenience of explanation from a perspective that lenses move.

The movement of lenses in the camera module of FIG. 12 may be controlled by a processor 320.

The camera module according to FIG. 12 includes a first camera holder 1210 and a second camera holder 1220. The first camera holder 1210 and the second camera holder 1220 are coupled (or connected) in a mutually movable manner.

An image sensor 1211 is disposed at one end of the first camera holder 1210. The image sensor 1211 may obtain light that has passed through an incident lens module 1222, a prism lens module 1221, a first lens module 1230, a second lens module 1243, and/or a third lens module 1253.

The second lens module 1243 to which a first magnet 1242 is attached and/or the third lens module 1253 to which a second magnet 1252 is attached are disposed at least in a space constructed by the first camera holder 1210 and/or the second camera holder 1220.

The second lens module 1243 is disposed inside a second carrier 1240, and the third lens module 1253 is disposed inside a third carrier 1250.

The image sensor 1211, the second lens module 1243, and the third lens module 1253 are disposed along a first optical axis.

The second lens module 1243 and the third lens module 1253 may move in a direction of the first optical axis. For example, the second lens module 1243 and the third lens module 1253 may move in the direction of the first optical axis by using a VCM scheme based on driving units 1251 and 1241 consisting of the magnets 1252 and 1242, a coil, and a hall sensor.

The driving units 1241 and 1251 may be disposed between a carrier (e.g., the second carrier 1240, the third carrier 1250) and the camera holders 1210 and 1220. For example, the first driving unit 1251 is disposed inside the first camera holder 1210. The second driving unit 1241 is disposed inside the second camera holder 1220. Current flowing in a coil inside the driving units 1241 and 1251 may affect the magnets 1242 and 1252 inside the carrier (e.g., the second carrier 1240 and the third carrier 1250).

The first lens module 1230 may be disposed to the second camera holder 1220. For example, the first lens module 1230 may be disposed on the first optical axis.

The prism lens module 1221 is disposed on one end of the second camera holder 1220. The prism lens module 1221 is disposed adjacent to the first lens module 1230 on the first optical axis. The prism lens module 1221 is also disposed adjacent to the incident lens module 1222 disposed in a hole through which external light can pass.

The prism lens module 1221 and the incident lens module 1222 are arranged on a second optical axis perpendicular to the first optical axis. For example, the prism lens module 1221 is disposed at a point where the first optical axis and the second optical axis are orthogonal to each other. For example, the prism lens module 1221 may diffract light incident along the second optical axis through the incident lens module 1222 in the direction of the first optical axis.

The prism lens module 1221 may include an optical image stabilization (OIS) function. For example, the electronic device (e.g., the electronic device 100) may allow the prism lens module 1221 to perform the OIS, under the control of the processor 320.

The OIS function of the prism lens module 1221 may be omitted.

The processor 320 of the electronic device 100 may control the current flowing in the coil of the driving units 1241 and 1251. The processor 320 may control the movement of the magnets 1242 and 1252 by controlling the current of the coil, and the lens modules 1243 and 1253 may also move with the movement of the magnets 1242 and 1252. For example, the processor 320 may linearly move a carrier (e.g., the second carrier 1240 and the third carrier 1250) by controlling a piezoelectric actuator. The processor 320 may move a lens module (e.g., the second lens module 1243, the third lens module 1253) inside the carrier 1240 or 1250 through the VCM scheme. In addition, the processor may adjust focus by moving a carrier (e.g., the third carrier 1430) through a piezoelectric actuator and by fine-adjusting a position of lens modules (e.g., the second lens module 1243, the third lens module 1253) inside the carrier (e.g., the second carrier 1240, the third carrier 1250) through the VCM.

Figure 13:
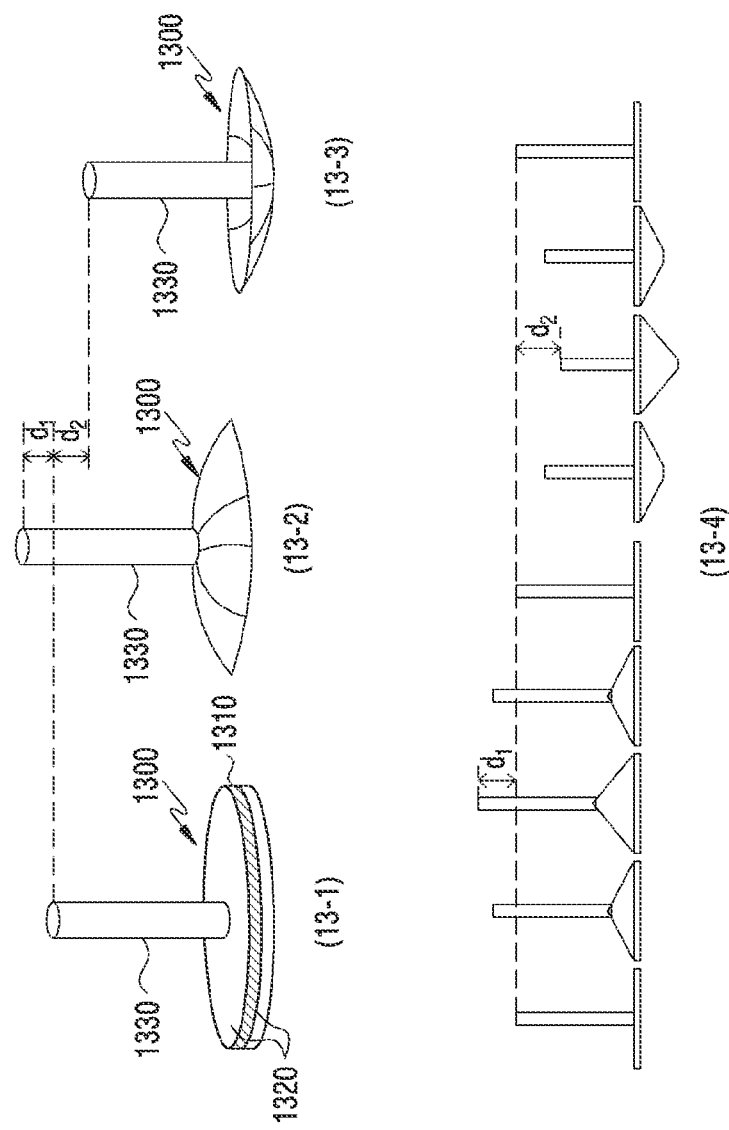
FIG. 13 is a diagram illustrating a piezoelectric actuator for moving a lens included in a camera module, according to an embodiment.

FIG. 13 is a diagram illustrating a piezoelectric actuator for moving a lens included in a camera module, according to an embodiment.

Referring to 13-1 of FIG. 13, a piezoelectric actuator 1300 includes an elastic portion 1310 including an elastic material, a piezoelectric ceramic 1320, and a shaft 1330.

The elastic portion 1310 is configured such that one face and an opposing face are covered by the piezoelectric ceramic 1320, and the shaft 1330 is connected to the piezoelectric ceramic 1320 covering one face of the elastic portion 1310.

When an electric field is applied to the piezoelectric ceramic 1320 polarized in one direction, a contraction or expansion motion (or vibration) may occur in the piezoelectric ceramic 1320 depending on a direction of the polarization and a direction of the applied electric field, and the piezoelectric actuator 1300 may vibrate.

Referring to 13-2 and 13-3, the shaft 1330 moves upward by d1 or downward by d2, with the contraction and expansion of the piezoelectric ceramic 1320 of the piezoelectric actuator 1300. The aforementioned d1 and d2 are for example only, and d1 and d2 may be identical or different values.

Referring to 13-4, the shaft 1330 of the piezoelectric actuator 1300 moves upward and downward by d1 and d2 while vibrating, and such vertical vibration may be repeated or controlled.

The shaft 1330 of the piezoelectric actuator 1300 may perform a forward moving operation and/or a backward moving operation. For example, the forward moving operation of the shaft 1330 of the piezoelectric actuator 1300 may imply an operation of slowly moving the shaft 1330 forward and rapidly returning the shaft 1330 to an original position.

The backward moving operation of the shaft 1330 of the piezoelectric actuator 1300 may imply an operation of rapidly moving the shaft 1330 forward and slowly returning the shaft 1330 to the original position.

The processor 320 of the electronic device 100 may control the electric field applied to the piezoelectric ceramic 1320 of the piezoelectric actuator 1300, and may control the movement of the shaft 1330 according to the control.

Figure 14:
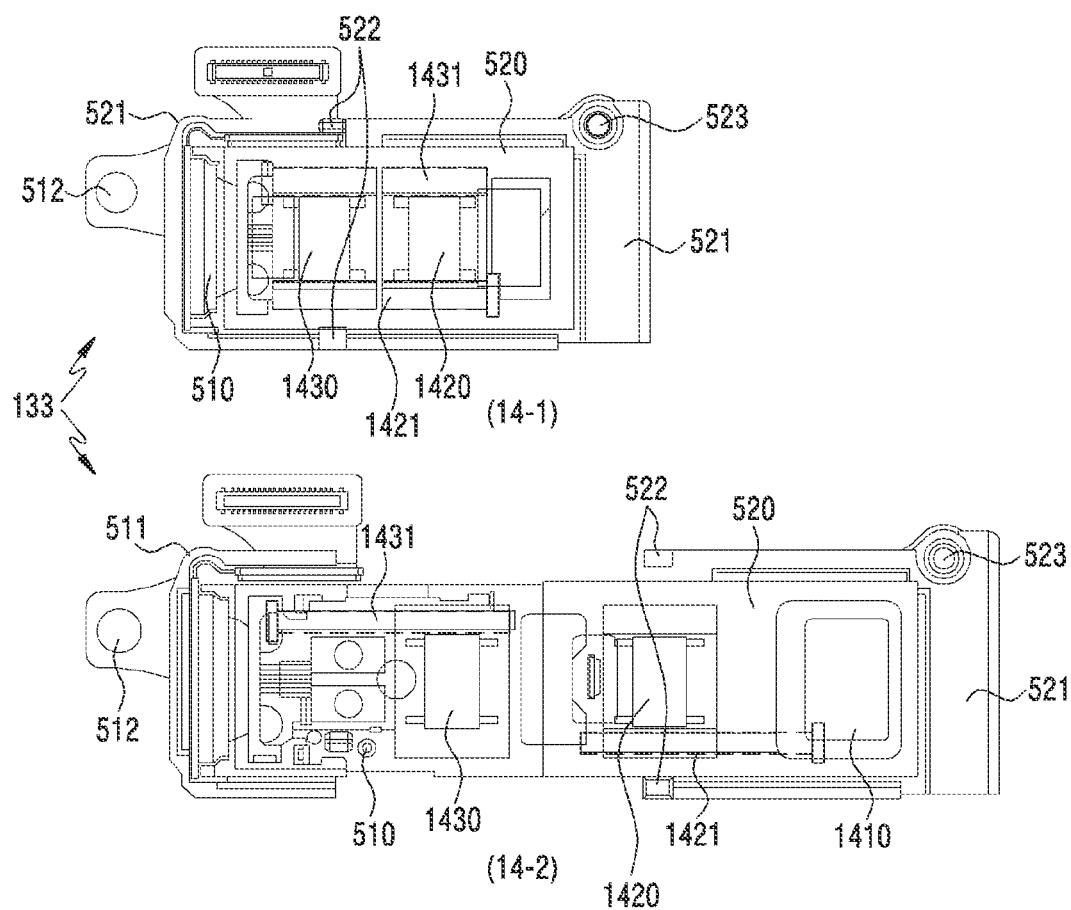
FIG. 14 is a diagram illustrating a change in a structure of a camera module, according to an embodiment.

FIG. 14 is a diagram illustrating a change in a structure of a camera module, according to an embodiment. Specifically, FIG. 14 illustrates a specific implementation of the camera module of FIG. 12.

14-1 of FIG. 14 illustrates a state before the third camera module 133 is extended, and 14-2 of FIG. 14 illustrates a state in which the third camera module 133 is extended.

The third camera module 133 of 14-1 and 14-2 may correspond to the third camera module 133 of FIG. 5 and FIG. 6.

A first carrier 1410, a second carrier 1420, and a third carrier 1430 are disposed inside a space constructed by the first camera module 510 and the second camera module 520. The first carrier 1410, the second carrier 1420, and the third carrier 1430 are disposed on the same optical axis.

The first carrier 1410, the second carrier 1420, and the third carrier 1430 may include a lens module including at least one lens.

The first carrier 1410 is disposed inside the second camera holder 520. For example, the first carrier 1410 is fixed inside the second camera holder 520.

A first piezoelectric actuator 1421 (e.g., the piezoelectric actuator 1300 of FIG. 13) is disposed in at least part of an inner space constructed by the first camera holder 510 and the second camera holder 520. For example, the first piezoelectric actuator 1421 is disposed close to a side where the first carrier 1410 is located.

At least part of the first piezoelectric actuator 1421 is disposed in a first hole of the second carrier 1420 and a fourth hole penetrating the third carrier 1430. For example, a shaft 1330 of the first piezoelectric actuator 1421 may be disposed in the first hole of the second carrier 1420 and the fourth hole penetrating the third carrier 1430. In a hole where the first piezoelectric actuator 1421 is disposed, a diameter of the fourth hole of the third lens module 1430 may be greater than a diameter of the first hole of the second carrier 1420. For example, in case of a circular hole, the diameter of the fourth hole of the third lens module 1430 may be greater than the diameter of the first hole of the second carrier 1420. In this case, when the first piezoelectric actuator 1421 vibrates, the second lens module 1420 may move due to the vibration.

A second piezoelectric actuator 1431 is disposed in at least part of an inner space constructed by the first camera holder 510 and the second camera holder 520. For example, the second piezoelectric actuator 1431 may be disposed close to a side where the third carrier 1430 is located.

At least part of the second piezoelectric actuator 1431 may be disposed in a second hole of the second carrier 1420 or a third hole penetrating the third carrier 1430. For example, a shaft 1330 of the second piezoelectric actuator 1431 may be disposed in the second hole of the second carrier 1420 and the third hole penetrating the third carrier 1430. In a hole where the second piezoelectric actuator 1431 penetrates, the second hole of the second carrier 1420 may be greater than the third hole of the third carrier 1430. For example, in case of a circular hole, a diameter of the second hole of the second carrier 1420 may be greater than a diameter of the third hole of the third carrier 1430. In this case, when the second piezoelectric actuator 1431 vibrates, the third carrier 1420 may move due to the vibration.

Figure 15:
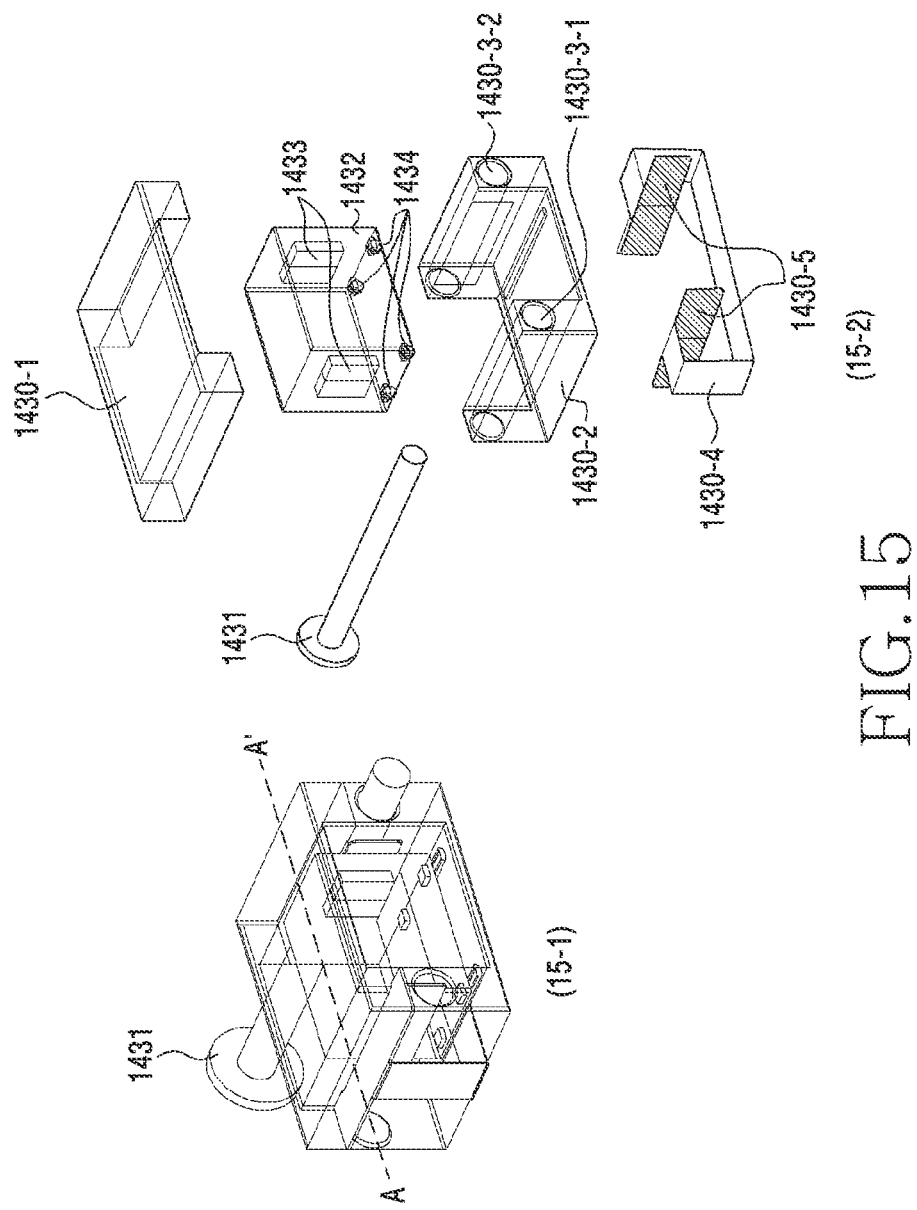
FIG. 15 is a diagram illustrating a structure for a lens module and carrier of a camera module, according to an embodiment.

FIG. 15 is a diagram illustrating a structure for a lens module and carrier of a camera module, according to an embodiment.

15-1 of FIG. 15 is a view illustrating a structure for a lens module and carrier (e.g., the third carrier 1430 or second carrier 1420 of FIG. 14), and 15-2 of FIG. 15 is an exploded perspective view illustrating a structure for a lens module and carrier.

A first carrier 1430-1 and a second carrier 1430-2 construct a periphery while enclosing a lens module 1432. For example, the first carrier 1430-1 constructs an upper periphery while enclosing the lens module 1432, and the second carrier 1430-2 constructs a lower periphery while enclosing the lens module 1432.

The second carrier 1430-2 has holes 1430-3-1 and 1430-3-2 constructed to dispose a piezoelectric actuator (e.g., the first piezoelectric actuator 1421, the second piezoelectric actuator 1431).

The lens module 1432 is disposed inside the carriers 1430-1 and 1430-2. A magnet 1433 is attached to both sides of the lens module 1432. The lens module 1432 may include at least one lens.

A ball 1434 is disposed between the lens module 1432 and the second carrier 1430-2, so that the lens module 1432 moves on the second carrier 1430-2.

A PCB, a hall sensor 1430-3, and/or a coil 1430-5 may be disposed outside the second carrier 1430-2. For example, the PCB and a hall sensor 1430-4 may be disposed to surround at least part of the periphery of the second carrier 1430-2. In addition, the coil 1430-5 may be coupled to the hall sensor 1430-4, and may be disposed at a position corresponding to a position of the magnet 1433.

A carrier which constitutes a periphery, while the first carrier 1430-1 and/or the second carrier 1430-2 enclose the lens module 1432 at upper/lower portions, may correspond to the third carrier 1430 or second carrier 1420 of FIG. 14.

The holes 1430-3-1 and 1430-3-2 constructed at the second carrier 1430-2 may correspond to the holes constructed at the second carrier 1420 or third carrier 1430 of FIG. 14. For example, the hole 1430-3-1 may correspond to a first hole of the second carrier 1420, and the hole 1430-3-2 may correspond to a second hole of the second carrier 1420. As another example, the hole 1430-3-1 may correspond to a fourth hole of the third carrier 1430, and the hole 1430-3-2 may correspond to a third hole of the third carrier 1430.

Figure 16:
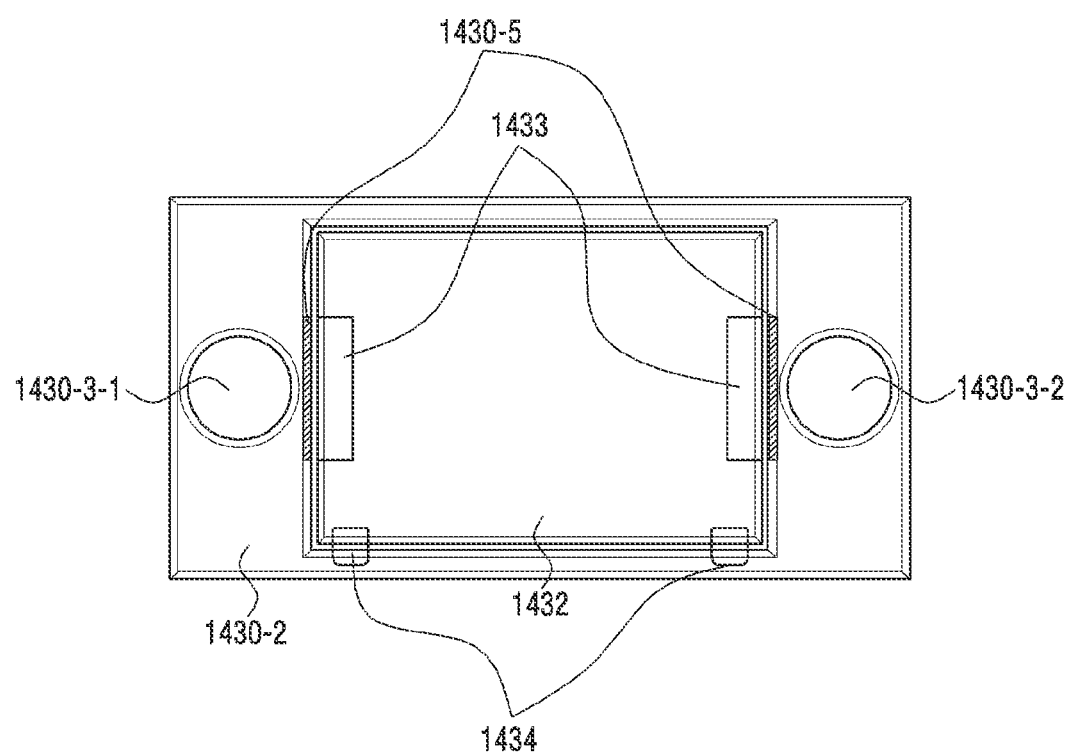
FIG. 16 is a diagram illustrating a cross-sectional view of a structure regarding a lens module and carrier of a camera module, taken along the line A-A', according to an embodiment.

FIG. 16 is a diagram illustrating a cross-sectional view of a lens module and carrier of a camera module, taken along the line A-A' in FIG. 15, according to an embodiment.

Referring to FIG. 16, the magnets 1433 and coils 1430-5 may be disposed at corresponding positions.

The ball 1434 may be disposed such that it is in contact with both the second carrier 1430-2 and the lens module 1432.

The holes 1430-3-1 and 1430-3-2 for disposing a piezoelectric actuator (e.g., a first piezoelectric actuator 1421 or a second piezoelectric actuator 1431) may be disposed in the second carrier 1430-2.

The first piezoelectric actuator 1421 may be disposed to the hole 1430-3-1, and the second piezoelectric actuator 1431 may be disposed to the hole 1430-3-2.

The structure of the lens module and carrier, described above with reference to FIG. 15 to FIG. 16, may apply to both the second carrier 1420 and the third carrier 1430.

Figure 17:
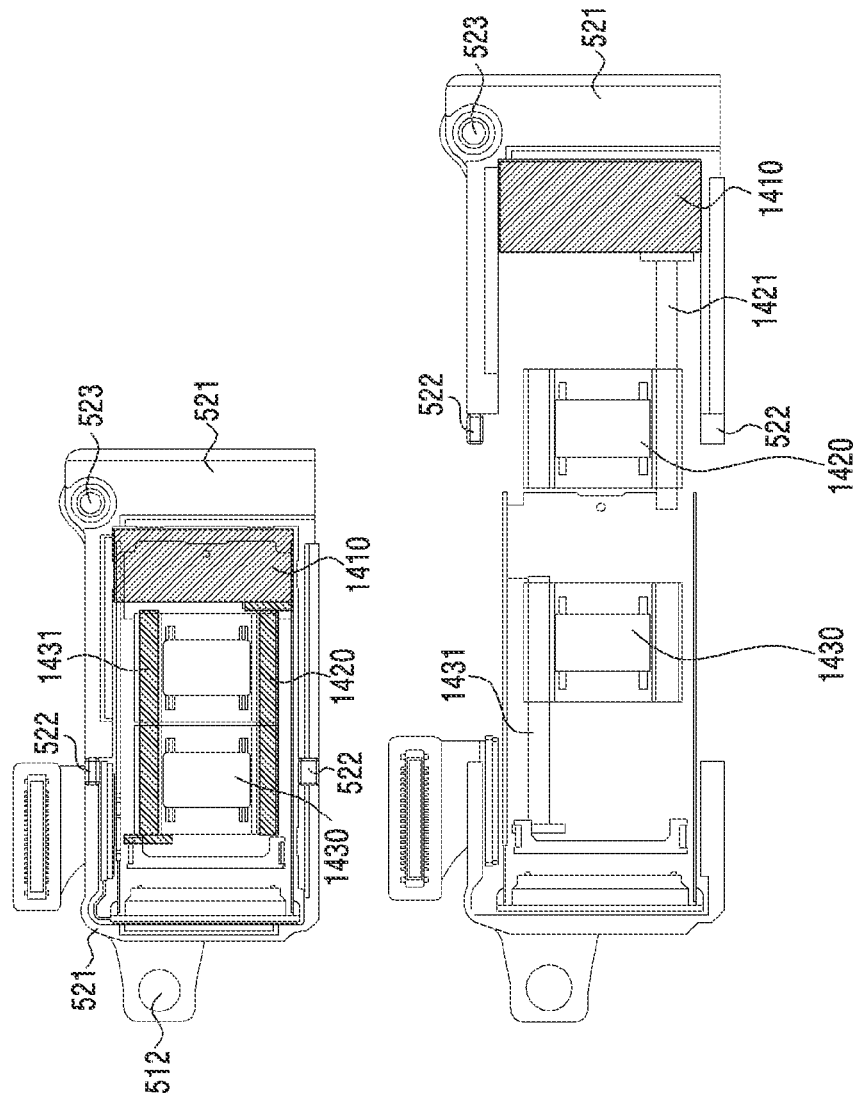
FIG. 17 is a diagram illustrating movement of a carrier and a lens module depending on a change in a structure of a camera module, according to an embodiment.

FIG. 17 is a diagram illustrating movement of a carrier and a lens module depending on a change in a structure of a camera module, according to an embodiment.

Specifically, FIG. 17 illustrates that a carrier (e.g., the second carrier 1420 or the third carrier 1430) moves by using a piezoelectric actuator.

Lens modules included in a carrier (e.g., the second carrier 1420, the third carrier 1430) may also move with the movement of the carrier (e.g., the second carrier 1420, the third carrier 1430) by using the piezoelectric actuator.

In the structure of the camera module of FIG. 17, some constructions may be omitted for convenience of explanation.

In a state in which a length of the first camera holder 510 and/or second camera holder 520 is not extended, a distance by which the second carrier 1420 or the third carrier 1430 can move may be shorter than in a state in which the length of the first camera holder 510 and/or second camera holder 520 is extended. For example, in the state in which the length of the first camera holder 510 and/or second camera holder 520 is not extended, the second carrier 1420 or the third carrier 1430 hardly moves, and only a lens module 1432 included in the second carrier 1420 or third carrier 1430 may move by using a magnet 1433 and a coil 1430.

The second carrier 1420 may be moved by vibration of the first piezoelectric actuator 1421. For example, when an electric field is applied under the control of a processor 320, the first piezoelectric actuator 1421 may vibrate, and thus, the second carrier 1420 may move linearly. The second carrier 1420 may move by a length corresponding to a shaft length of the first piezoelectric actuator 1421.

The third carrier 1430 may be moved by vibration of the second piezoelectric actuator 1431. For example, when an electric field is applied under the control of the processor, the second piezoelectric actuator 1431 may vibrate, and thus, the third carrier 1430 may move linearly. The third carrier 1430 may move by a length corresponding to a shaft length of the second piezoelectric actuator 1431.

Figure 18:
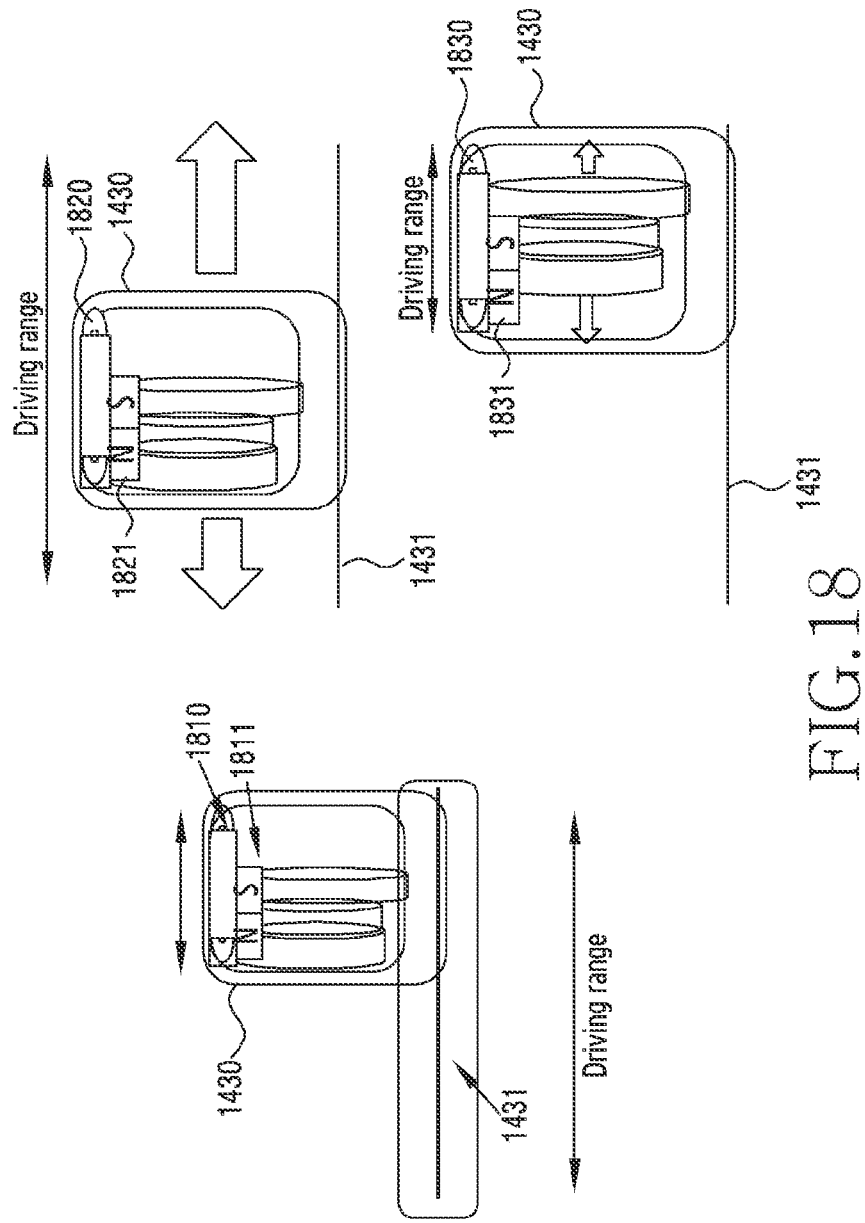
FIG. 18 is a diagram illustrating movement of a lens module and lens included in a camera module, according to an embodiment.

FIG. 18 is a diagram illustrating movement of a lens module and lens included in a camera module, according to an embodiment.

FIG. 18 is a conceptual diagram illustrated to explain movement of the lens module using a piezoelectric actuator and a movement of the lens using a VCM scheme.

The processor 320 may linearly move a carrier (e.g., the third carrier 1430) by controlling a piezoelectric actuator.

The processor may move the lens module inside the carrier through the VCM scheme. For example, the processor 320 may control current flowing in a coil (e.g., coils 1810, 1820, and 1830) to control a movement of a lens module to which magnets 1811, 1821, and 1831 are attached.

The processor 320 may move the carrier 1430 by using a piezoelectric actuator, and the lens modules inside the carrier may fine-adjust a position by using the VCM, thereby accurately being in focus.

Figure 19:
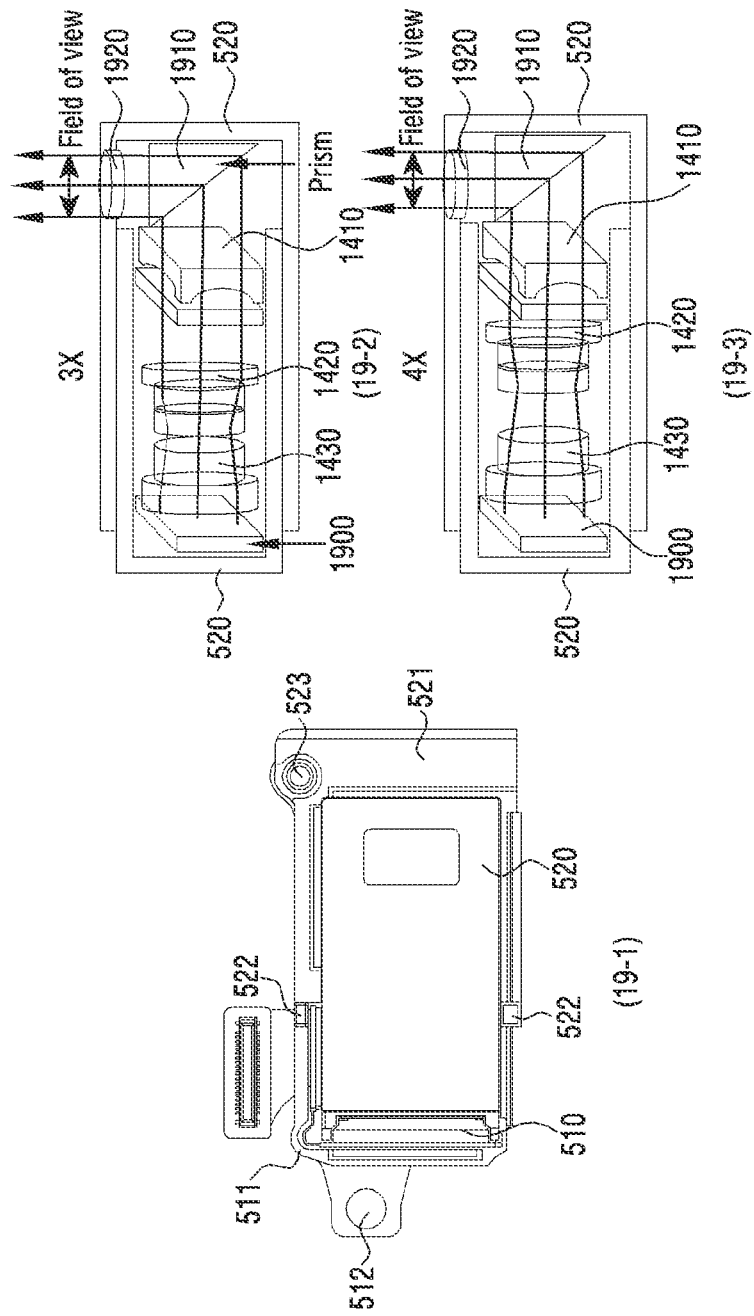
FIG. 19 is a diagram illustrating movement of lens modules inside a camera module depending on an optical magnification, when the camera module is in a default state, according to an embodiment.

FIG. 19 is a diagram illustrating movement of lens modules inside a camera module depending on an optical magnification, when the camera module is in a default state, according to an embodiment.

19-1 of FIG. 19 illustrates a structure of a camera module (e.g., the third camera module 133) before it is extended.

19-2 and 19-3 of FIG. 19 illustrate a position of lens modules, when a different optical magnification is set to each of the lens modules, in a state before the camera module 133 is extended.

The lens modules may be included in a carrier (e.g., the carriers 1410, 1420, and 1430), and may move together with the movement of the carrier.

In the case of 19-3, in which an optical magnification is 4×, the second carrier 1420 including a lens module (e.g., the second lens module) is located closer to the first carrier 1410 including a lens module (e.g., the first lens module), compared to the case of 19-2 in which an optical magnification is 3×. For example, the higher the optical magnification, the farther the distance between the second carrier 1420 and the third carrier 1430.

The processor 320 of the electronic device 100 may identify a changed length of a camera module 133, and may identify an arrangement data of carriers and/or lens modules which satisfy a set optical magnification (e.g., 3×, 4×), as shown in 19-2 and 19-3. In addition, the processor 320 may move the carriers 1420 and 1430 and the lens modules to be in the arrangement state.

Figure 20:
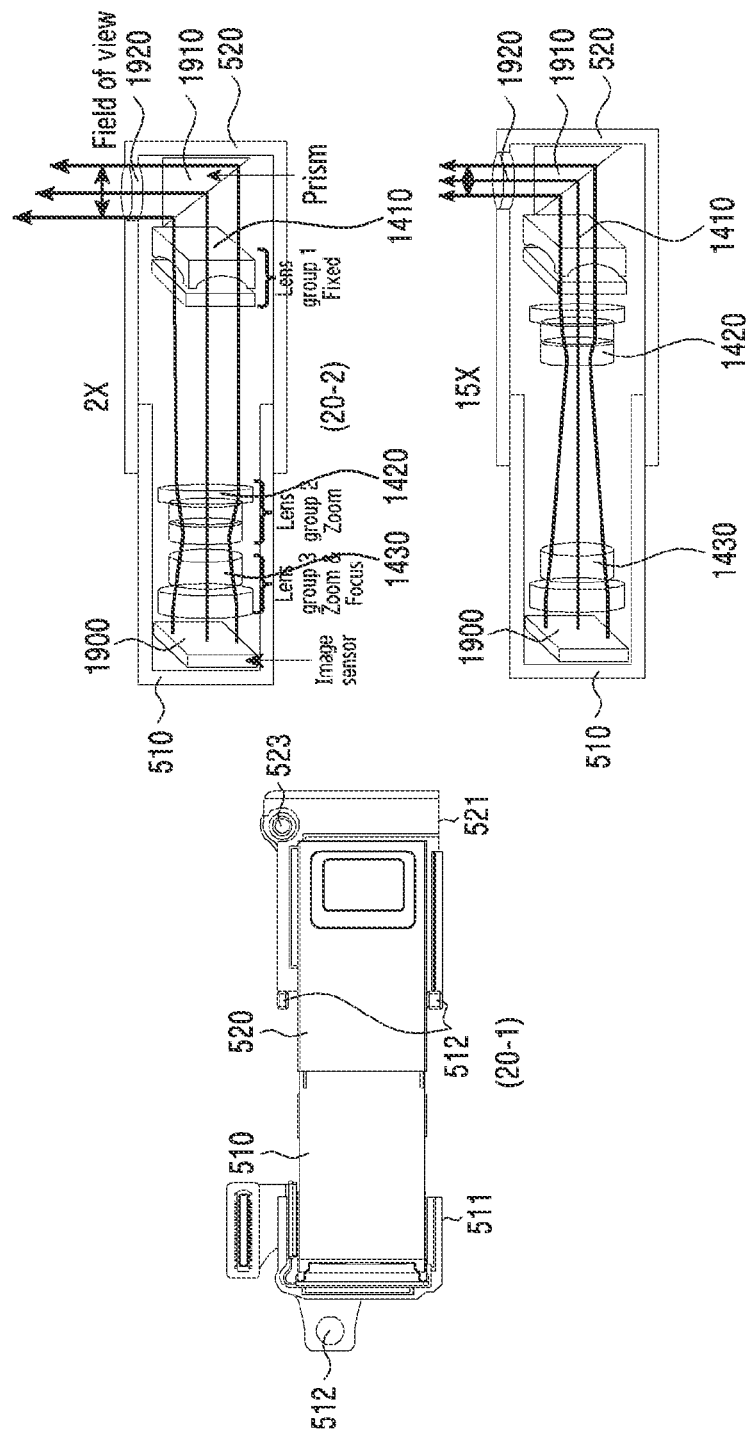
FIG. 20 is a diagram illustrating movement of carriers and lens modules inside a camera module depending on an optical magnification, when the camera module is in an extended state, according to an embodiment.

FIG. 20 is a diagram illustrating movement of carriers and lens modules inside a camera module depending on an optical magnification, when the camera module is in an extended state, according to an embodiment.

20-1 of FIG. 20 illustrates a structure in which a camera module (e.g., the third camera module 133) is in an extended state.

20-2 and 20-3 of FIG. 20 illustrate a position of lens modules, when a different optical magnification is set to each of the lens modules, in a state where a camera module is extended.

The lens modules may be included in a carrier (e.g., the carriers 1410, 1420, and 1430), and may move together with a movement of the carrier.

In the case of 20-3 in which an optical magnification is 15×, the second carrier 1420 including the second lens module may be located closer to the first carrier 1410 including the first lens module, compared to the case of 20-2 in which an optical magnification is 2×. For example, the higher the optical magnification, the farther the distance between the second carrier 1420 and the third carrier 1430.

The processor 320 of the electronic device 100 may identify a changed length of a camera module 133, and may identify an arrangement state of carriers and/or lens modules which satisfies a set optical magnification (e.g., 2×, 15×), as shown in 20-2 and FIG. 20-3. In addition, the processor may move the carriers 1420 and 1430 to be in the arrangement state.

Figure 21:
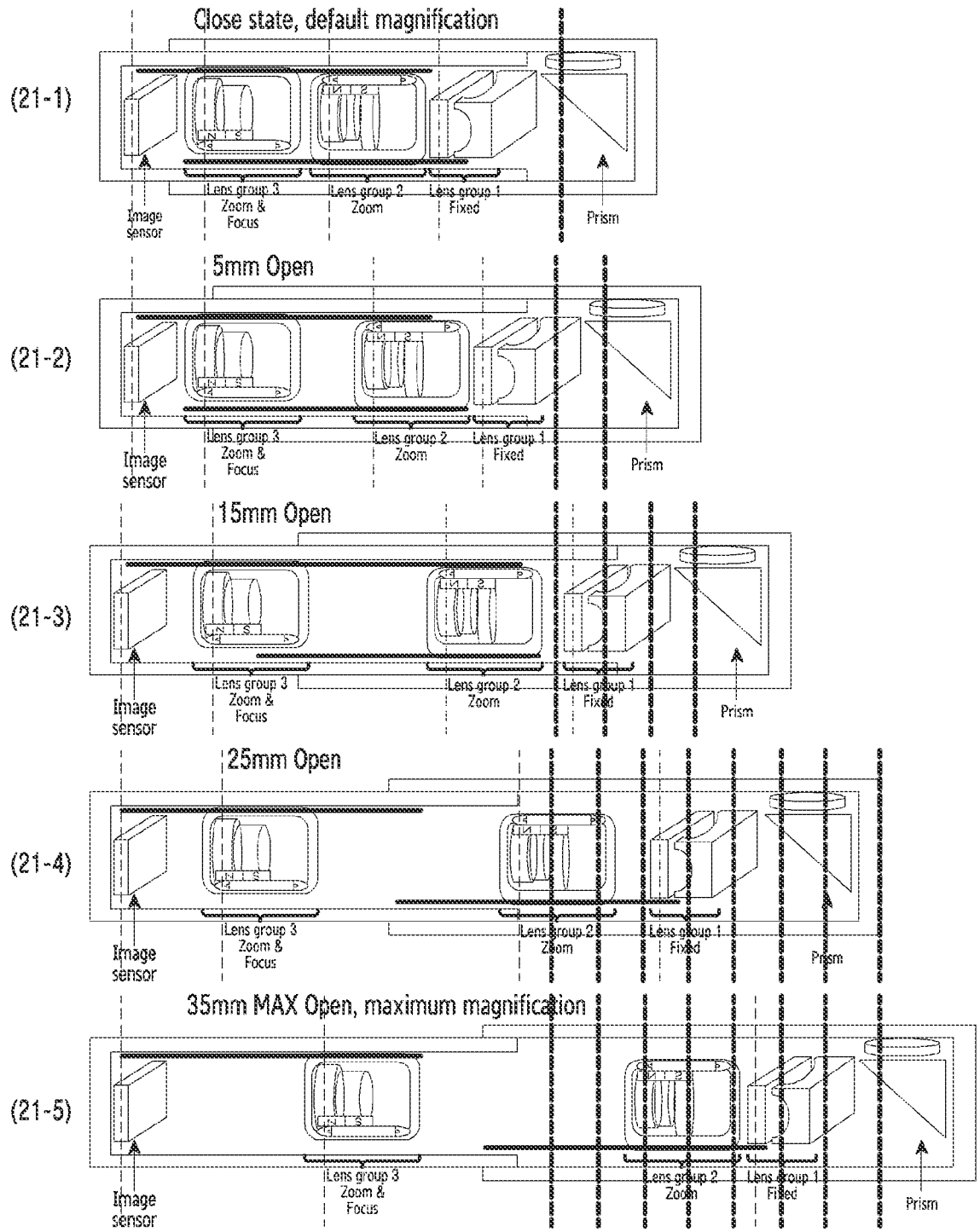
FIG. 21 is a diagram illustrating movement of carriers and/or lens modules depending on an optical magnification in response to a structural change of a camera module, according to an embodiment.

FIG. 21 is a diagram illustrating movement of carriers and/or lens modules depending on an optical magnification in response to a structural change of a camera module, according to an embodiment.

21-1 to 21-5 of FIG. 21 illustrate that an arrangement state of carriers and lens modules is changed, for example, when a camera module (is gradually extended, and thus, a magnification increases.

21-1 of FIG. 21 illustrates a state before a camera module is extended. 21-2 to 21-4 of FIG. 21 illustrate states in which the camera module is being extended. 21-5 of FIG. 21 illustrates a state in which the camera module is extended to the maximum extent.

The processor 320 of the electronic device 100 may identify a changed length of a camera module and/or camera holder with the extension of the camera module 133. For example, the electronic device 100 may detect a movement of a second housing 142 and/or an extension or reduction of an exposed area of the display 310 by using the device extension sensing module 350 under the control of the processor 320. In addition, the electronic device 100 may identify a change in a structure (e.g., a length or size) of the third camera module 133 corresponding to the movement of the second housing and/or the extension or reduction of the exposed area of the display 310 under the control of the processor 320. The electronic device 100 may identify a length of the camera module and/or camera holder changed depending on a structural change of the third camera module 133 under the control of the processor 320.

The processor 320 of the electronic device 100 may identify a set optical magnification. For example, the optical magnification may be pre-set in the camera module 330 by a user, or may be changed during the extension or reduction of the exposure area of the display 310.

The processor 320 of the electronic device 100 may identify an arrangement state or carriers and/or lens modules that satisfy the identified length and optical magnification of a camera module and/or camera holder. For example, the electronic device 100 may compare and map the identified length and optical magnification of the camera module and/or camera holder with data regarding the arrangement state of the carriers and/or lens modules and stored in the memory 340, under the control of the processor 320.

The processor of the electronic device may move the current carriers and/or lens modules so as to be the arrangement state of the carriers and/or lens modules.

As shown in FIG. 21, when using identical lens modules, the higher the optical magnification, the longer the camera holder in use.

Figure 22:
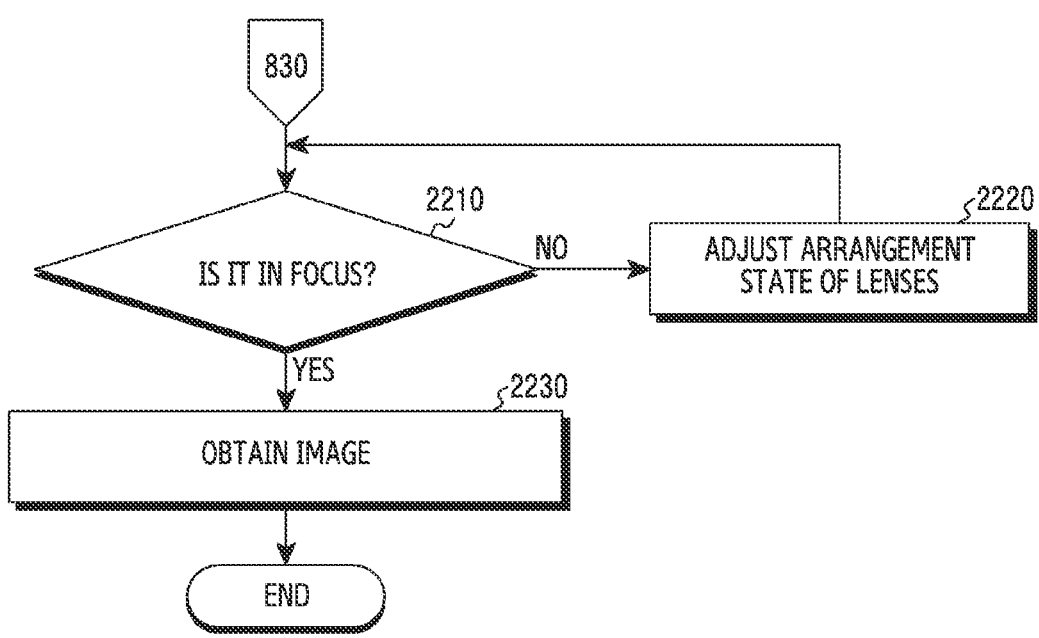
FIG. 22 is a flowchart illustrating a method in which an electronic device adjusts an arrangement state of lens modules depending on whether it is in focus, according to an embodiment.

FIG. 22 is a flowchart illustrating a method in which an electronic device adjusts an arrangement state of lens modules depending on whether it is in focus, according to an embodiment.

Figure 23:
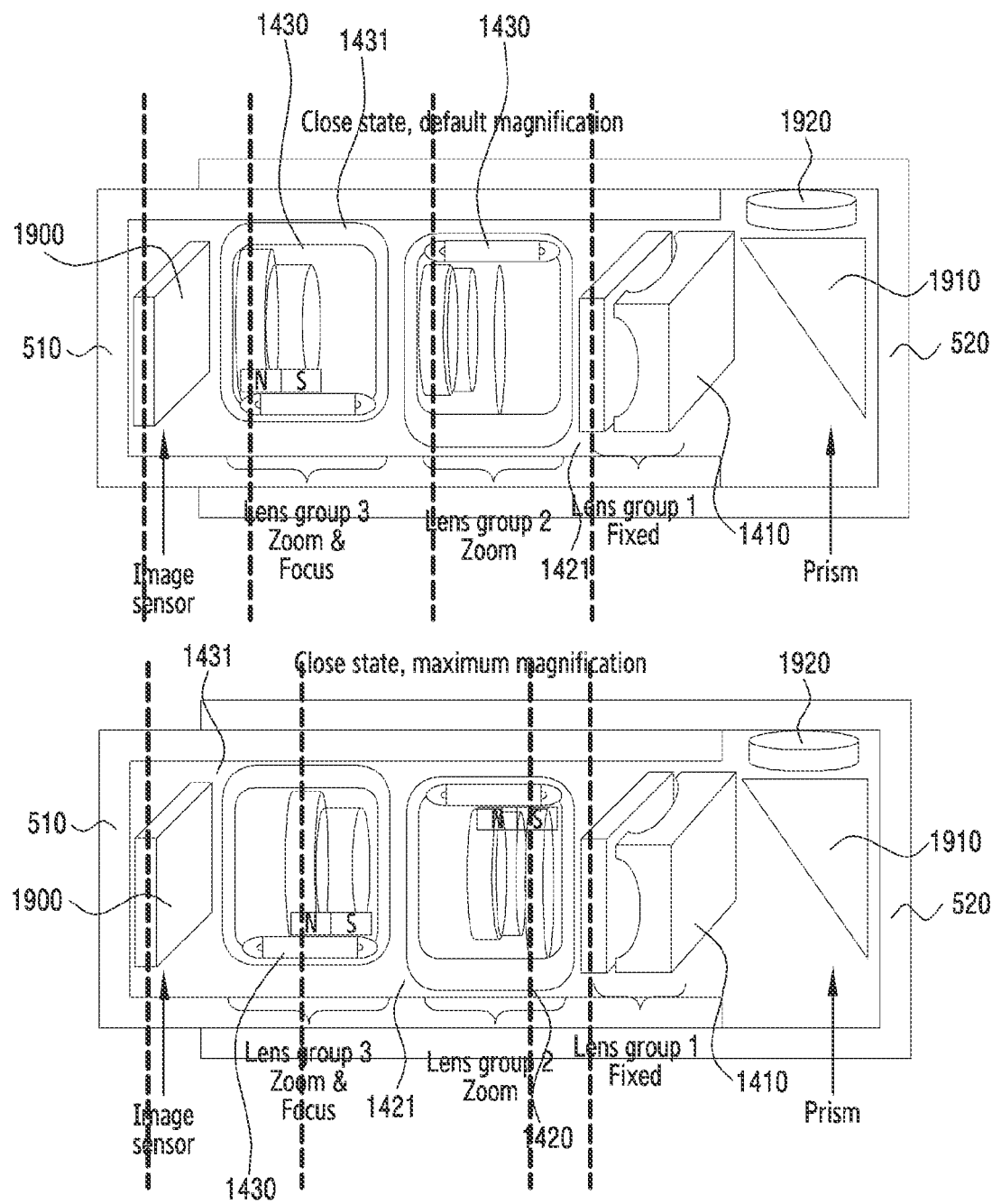
FIG. 23 is a diagram illustrating adjustment of an arrangement of lenses by an electronic device, according to an embodiment.

The flowchart of FIG. 22 is described with reference to FIG. 23 illustrating that an electronic device adjusts an arrangement state of lenses.

In operation 830 of FIG. 8, the electronic device 100 moves carriers and/or lens modules to be an identified arrangement state, under the control of a processor 320.

The electronic device 100 may move a carrier (e.g., the second carrier 1420 or the third carrier 1430) to the identified arrangement state, under the control of the processor 320.

In 2210 of FIG. 22, the electronic device determines whether an image is accurately in focus, under the control of the processor.

The electronic device 100 may determine whether an image is accurately in focus by using an image sensor 1900 under the control of the processor 320.

The electronic device 100 obtains the image in 2230, upon determining that it is accurately in focus, under the control of the processor 320.

Upon determining that the image is not accurately in focus, the electronic device 100 adjusts the arrangement state of the lenses in 2220, under the control of the processor 320.

In 2220, the electronic device may adjust (or readjust) the arrangement state of the lens modules, under the control of the processor.

Upon determining that the image is not accurately in focus, a position of lens modules included in a carrier (e.g., the second carrier 1420, the third carrier 1430) may be fine-adjusted, under the control of the processor 320. For example, the second lens module included in the second carrier 1420 and/or the third lens module included in the third carrier 1430 may move to correspond to the identified arrangement state, under the control of the processor 320. Even if the second carrier 1420 and the third carrier 1430 are moved in the identified arrangement state, the image may not be accurately in focus due to the position of lens modules included in the carriers 1420 and 1430. In this case, the electronic device 100 may fine-adjust the position of the lens modules included in the carriers 1420 and 1430 through a VCM scheme, under the control of the processor 320.

When the image is not in focus even if the position of the lens modules included in the carriers 1420 and 1430 is adjusted through the VCM scheme, the position of the lens modules and/or the carriers 1420 and 1430 may be moved again.

FIG. 23 illustrates that a position of lens modules included in the carriers 1420 and 1430 is fine-adjusted depending on an optical magnification. For example, the electronic device 100 may fine-adjust the position of the lens module to which a magnet is connected, by controlling current of a coil under the control of the processor 320.

In 2230 of FIG. 22, the electronic device may obtain an image, under the control of the processor.

Upon determining that the image is accurately in focus, the electronic device 100 may obtain the image without having to perform an additional operation of adjusting the arrangement state of the carrier and/or lens modules, under the control of the processor 320.

Figure 24:
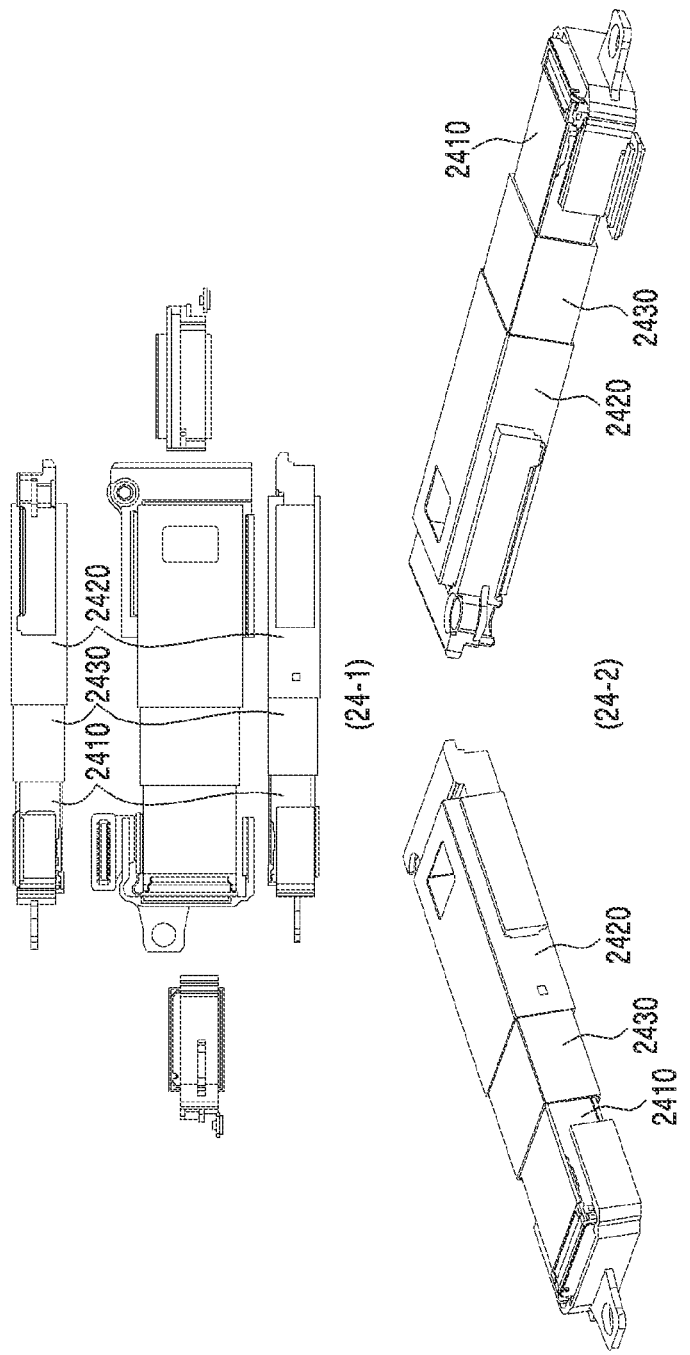
FIG. 24 is a diagram illustrating a structure of a camera module included in an electronic device, according to another embodiment.

FIG. 24 is a diagram illustrating a structure of a camera module included in an electronic device, according to another embodiment.

24-1 and 24-2 of FIG. 24 illustrate a structure including three or more camera modules in a structure of a camera module (e.g., the third camera module 133). Since the camera module includes three or more camera holders, it may be possible to respond to various extended distances and optimize the structure.

Although a structure of a camera module including two camera holders (e.g., the first camera holder 510, the second camera holder 520) is illustrated in FIG. 4 to FIG. 23, the camera module may include three or more camera holders.

In addition to a difference in the number of camera holders, regarding a structure, the aforementioned description on the structure of the camera module of FIG. 4 to FIG. 23 may be applied.

A camera module includes a first camera holder 2410 and a second camera holder 2420. A third camera holder 2430 is disposed between the first camera holder 2410 and the second camera holder 2420.

The first camera holder 2410 and the third camera holder 2430 are movably coupled (or connected) to each other, and the third camera holder 2430 and the second camera holder 2420 are also movably coupled (or connected) to each other.

Figure 25:
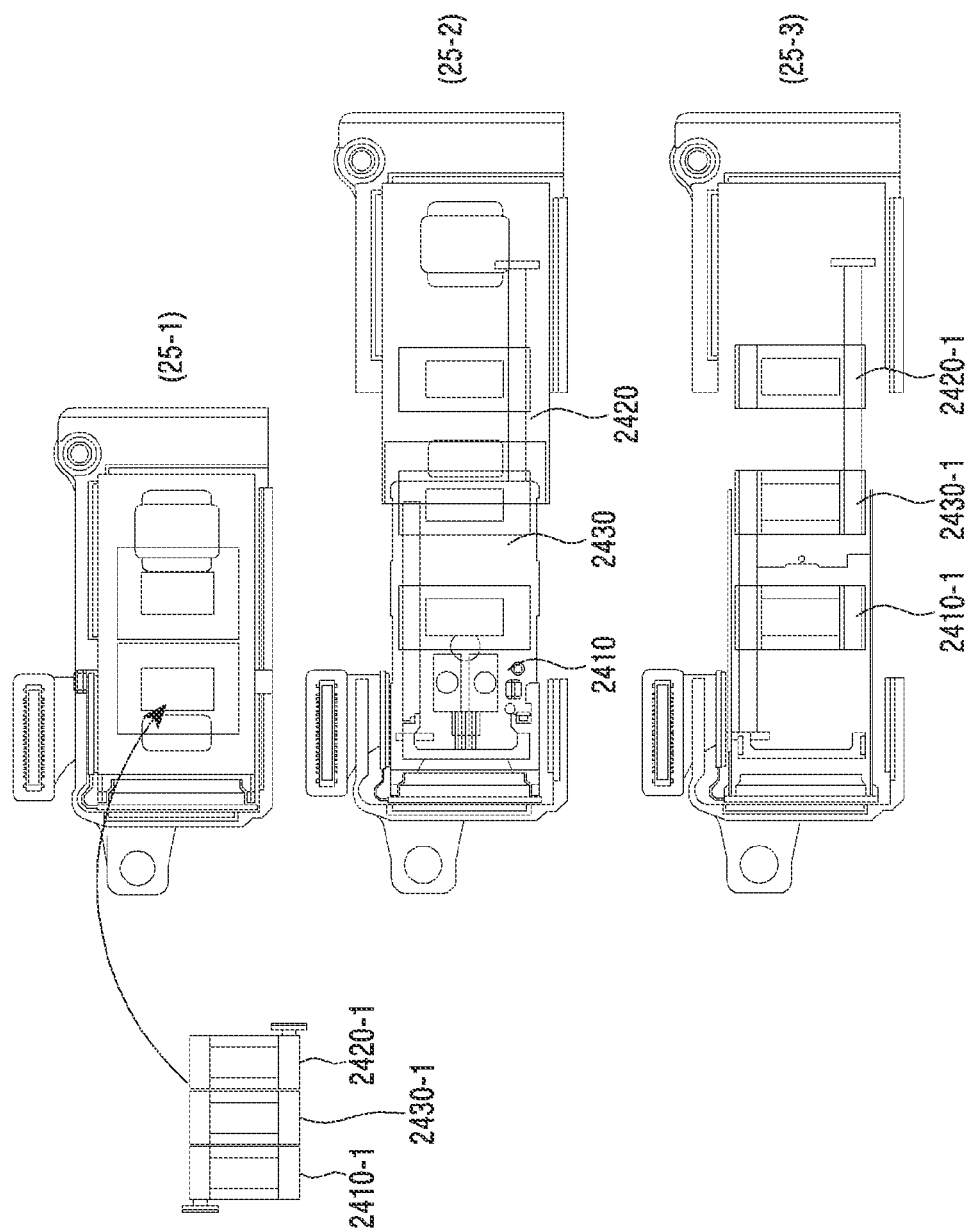
FIG. 25 is a diagram illustrating movement of carriers including lens modules depending on a structural change of a camera module, according to another embodiment.

FIG. 25 is a diagram illustrating movement of carriers including lens modules depending on a structural change of a camera module, according to another embodiment.

25-1 of FIG. 25 illustrates a state before a camera module (e.g., the third camera module 133) is extended.

Specifically, 25-1 of FIG. 25 illustrates that carriers (e.g., a first carrier 2410-1, a second carrier 2420-1, or a third carrier 2430-1) are disposed in a camera module including three camera holders (e.g., the first camera holder 2410, the second camera holder 2420, and the third camera holder 2430).

25-2 of FIG. 25 illustrates a state in which a camera module (e.g., the third camera module 133) is extended.

The first camera holder 2410 is movably coupled (or connected) to the third camera holder 2430. In addition, the third camera holder 2430 is movably coupled (or connected) to the second camera holder 2420.

In an embodiment, carriers may be disposed to a space constructed by camera holders.

Referring to 25-3 of FIG. 25, the first carrier 2410-1 and the third carrier 2430-1 may share a first piezoelectric actuator (1300. The piezoelectric actuator may be involved in a movement of the first carrier 2410-1. In another example, the third carrier 2430-1 and the second carrier 2420-1 may share a second piezoelectric actuator. The second piezoelectric actuator may be involved in a movement of the second carrier 2420-1.

The third carrier 2430-1 is disposed so as not to be moved by being fixed to the third camera holder 2430. In this case, the third carrier 2430-1 may not share the first piezoelectric actuator or the second piezoelectric actuator.

Descriptions on the movement of carriers using the piezoelectric actuator described with reference to FIG. 13 to FIG. 18 may also apply to descriptions on a camera module including three camera holders.

Figure 26:
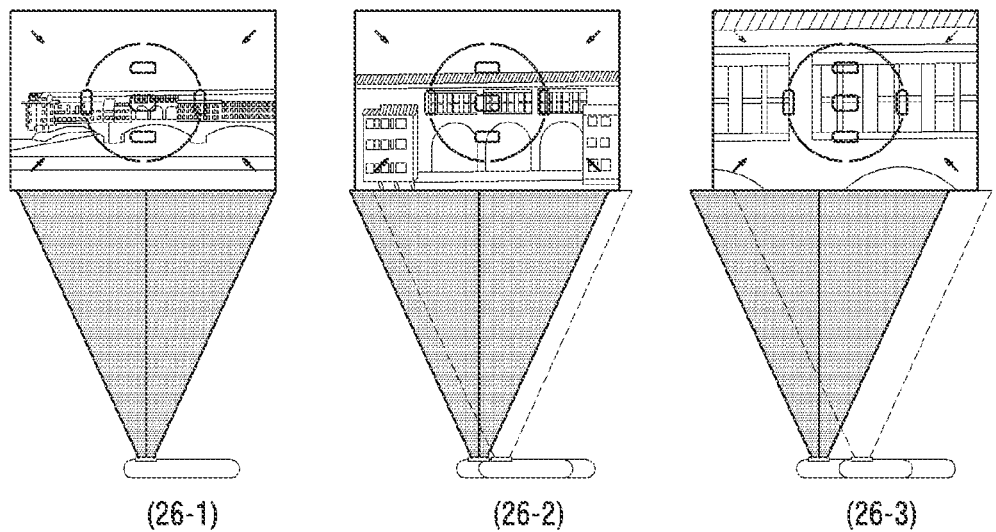
FIG. 26 is a diagram illustrating a zoom-in/zoom-out operation related to a change in a size of an exposed area of a display of an electronic device, according to an embodiment.

FIG. 26 is a diagram illustrating a zoom-in/zoom-out operation related to a change in a size of an exposed area of a display of an electronic device, according to an embodiment of the disclosure.

26-1 to 26-3 are diagrams illustrating a zoom-in/zoom-out operation of an electronic device 100 depending on an extension or reduction of a display 310.

When a user extends an area (e.g., an exposed area) visible from the outside of the display 310, the electronic device 100 may perform the zoom-in operation under the control of the processor 320. For example, when the user uses a hand to extend the area visible from the outside of the display 310, the electronic device 100 may perform the zoom-in operation at a magnification corresponding to a level of extension under the control of the processor 320, thereby providing the user with an image of a high magnification. As another example, when the area visible from the outside of the display 310 is extended from the state of 26-1 to the state of 26-3, the electronic device 100 may perform the zoom-in operation under the control of the processor 320 to provide the user with an enlarged image.

When the user reduces the area visible from the outside of the display 310, the electronic device 100 may perform the zoom-out operation under the control of the processor 320. For example, when the user uses the hand to reduce the area visible from the outside of the display 310, the electronic device 100 may perform the zoom-out operation at a magnification corresponding to a level of reduction under the control of the processor 320, thereby providing the user with an image of a low magnification. As another example, when the area visible from the outside of the display 310 is reduced from the state of 26-3 to the state of 26-1, the electronic device 100 may perform the zoom-out operation under the control of the processor 320 to provide the user with an image of a low magnification.

When the area visible from the outside of the display 310 is enlarged or reduced, without having to perform the zoom-in operation or the zoom-out operation on a preview screen under the control of the processor 320, the electronic device 100 may display an available optical magnification on the screen, based on a size of the area. For example, when the user sets the optical magnification, the electronic device 100 may display a preview screen corresponding to the optical magnification under the control of the processor 320.

Figure 27:
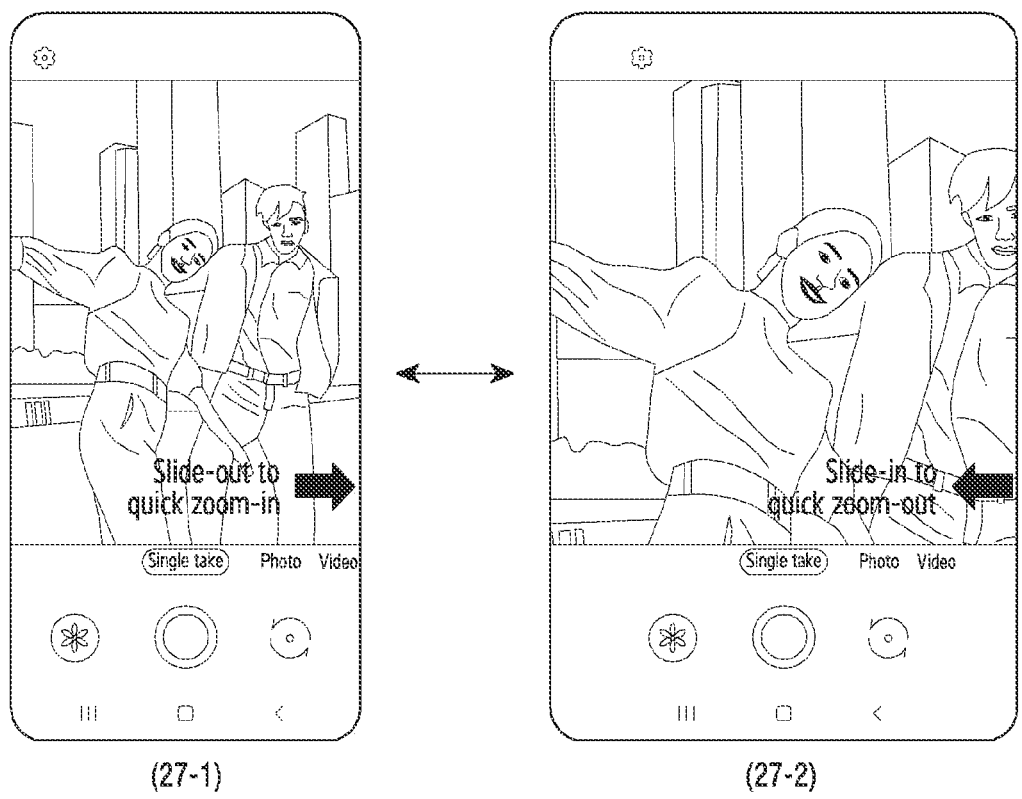
FIG. 27 is a diagram illustrating a user interface that induces zoom-in/zoom-out related to a change in a size of an exposed area of a display of an electronic device, according to an embodiment.

FIG. 27 is a diagram illustrating a user interface that induces zoom-in/zoom-out related to a change in a size of an exposed area of a display of an electronic device, according to an embodiment.

Referring to 27-1 of FIG. 27, the electronic device 100 provides a user interface for inducing a user to perform a slide-out operation for zoom-in under the control of the processor 320. For example, when an area visible from the outside of the display 310 is enlarged while the electronic device 100 provides the user with an image through the display 310 at a specific magnification, a user interface (e.g., slide out to quick zoom in) for providing information indicating that an image of a higher magnification can be provided is displayed under the control of the processor 320.

Referring to 27-2 of FIG. 27, the electronic device 100 provides a user interface for inducing the user to perform a slide-in operation for zoom-out under the control of the processor 320. For example, when an area visible from the outside of the display 310 is reduced while the electronic device 100 provides the user with an image through the display 310 at a specific magnification, a user interface (e.g., slide out to quick zoom out) for providing information indicating that an image of a lower magnification can be provided is displayed under the control of the processor 320.

As described above, a more improved user experience may be provided by displaying the user interface for inducing the user to perform the zoom-in/zoom-out.

Figure 28:
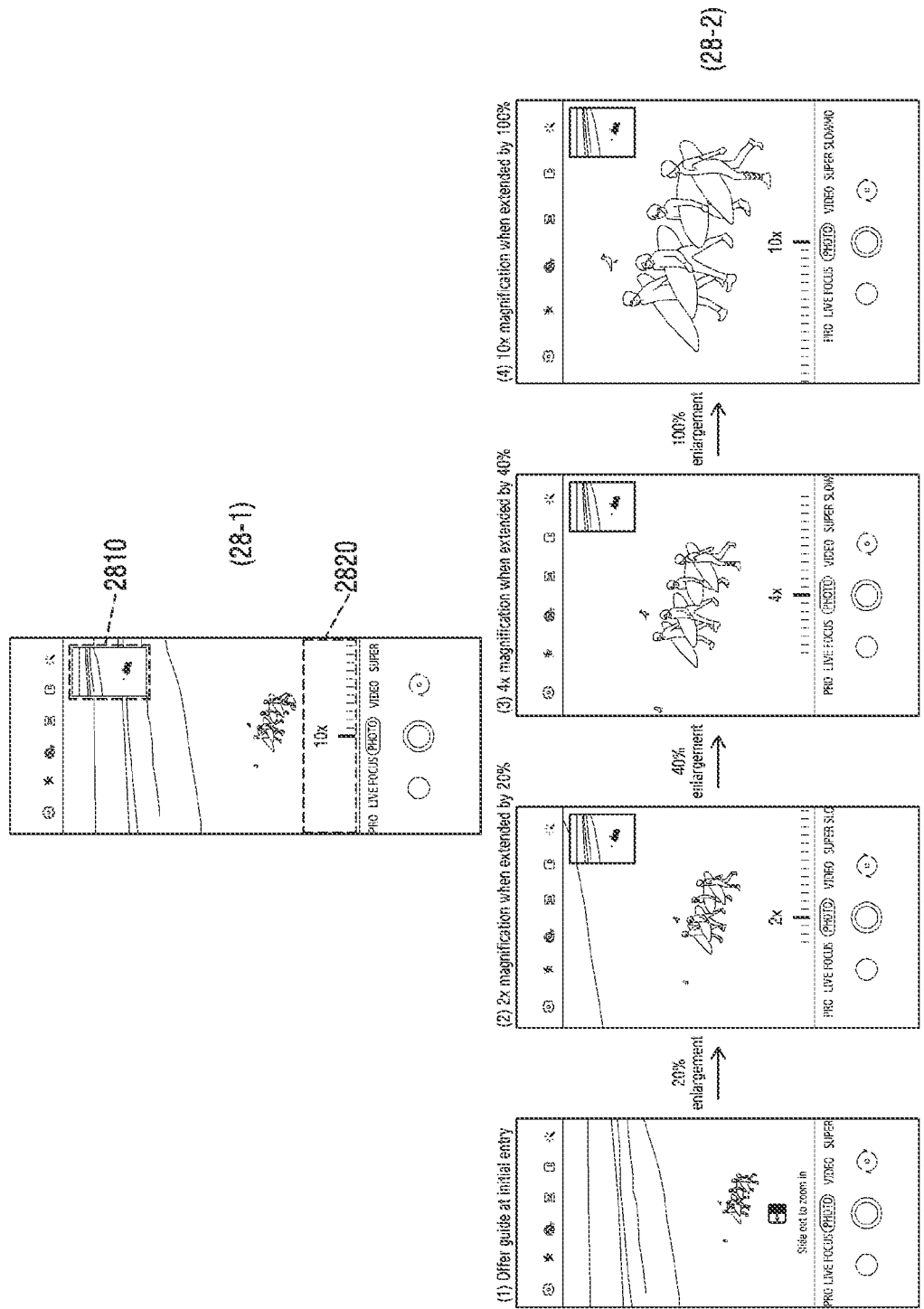
FIG. 28 is a diagram illustrating a user interface in which a size of an exposed area of a display of an electronic device and an optical magnification are associated, according to an embodiment.

FIG. 28 is a diagram illustrating a user interface in which a size of an exposed area of a display of an electronic device and an optical magnification are associated, according to an embodiment.

Referring to 28-1, the electronic device 100 displays a zoom preview 2810 or a magnification display area 2820 on a screen of the display 310, under the control of the processor 320.

A preview screen for an image which is changed to a high magnification/low magnification when zoomed in/zoomed out may be displayed in the zoom preview 2810.

A magnification of an image displayed in the screen of the display 310 is displayed in the magnification display area 2820 according to an extension of the display 310. As another example, the magnification of the image displayed in the screen may provide an image magnification that can be set by a user.

Referring to FIG. 28-2 of FIG. 28, the electronic device 100 displays a first screen when the user first enters an application, under the control of the processor 320.

The electronic device 100 displays a user interface which is enlarged at 2× magnification when extended by 20% with respect to a maximum extended area visible from the outside of the display 320, under the control of the processor 320. As another example, when extended by 20% with respect to the maximum extended area visible from the outside of the display 320, the user may set the optical magnification by up to 2× magnification.

The electronic device 100 displays a user interface which is enlarged at 4× magnification when extended by 40% with respect to a maximum extended area visible from the outside of the display 320, under the control of the processor 320. As another example, when extended by 40% with respect to the maximum extended area visible from the outside of the display 320, the user may set the optical magnification by up to 4× magnification.

The electronic device 100 displays a user interface which is enlarged at 10× magnification when extended by 100% with respect to a maximum extended area visible from the outside of the display 320, under the control of the processor 320. As another example, when extended by 100% with respect to the maximum extended area visible from the outside of the display 320, the user may set the optical magnification by up to 100× magnification.

As described above, the electronic device 100 may provide the user with a more improved user experience by displaying a magnification depending on a level of extension of the display 320, under the control of the processor 320. In addition, the aforementioned numerical values are for exemplary purposes only, and may vary depending on settings without any special limitations.

Figure 29:
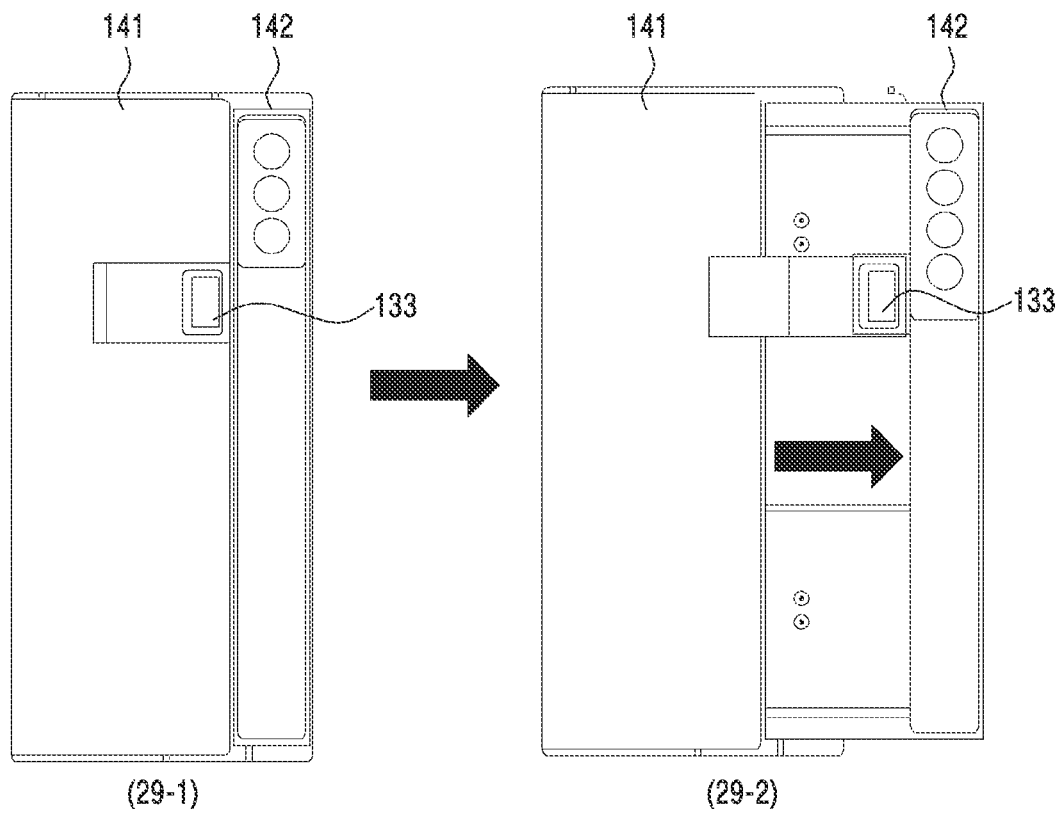
FIG. 29 is a diagram illustrating a camera module is disposed to an electronic device, according to another embodiment.

FIG. 29 is a diagram illustrating a camera module disposed in an electronic device, according to another embodiment.

Referring to 29-1 of FIG. 29, at least part of the third camera module 133 is not visible from a rear face in a state in which the display 320 is not extended.

Referring to 29-2 of FIG. 29, at least part of the third camera module 133 is visible from the rear face in a state where the display 320 is extended.

As described above, since the third camera module 133 is disposed to an area in which the second housing 142 and the first housing 141 overlap, the third camera module 133 may not be visible from the outside depending on whether the area visible from the outside of the display 320 is extended. For example, in a state in which the area visible from the outside of the display 320 is not extended, the third camera module 133 may not be visible from the outside, and may not operate in practice. As another example, when the area visible from outside of the display 320 is extended, at least part of the third camera module 133 may be visible from the outside, and the third camera module 133 may operate.

Figure 30:
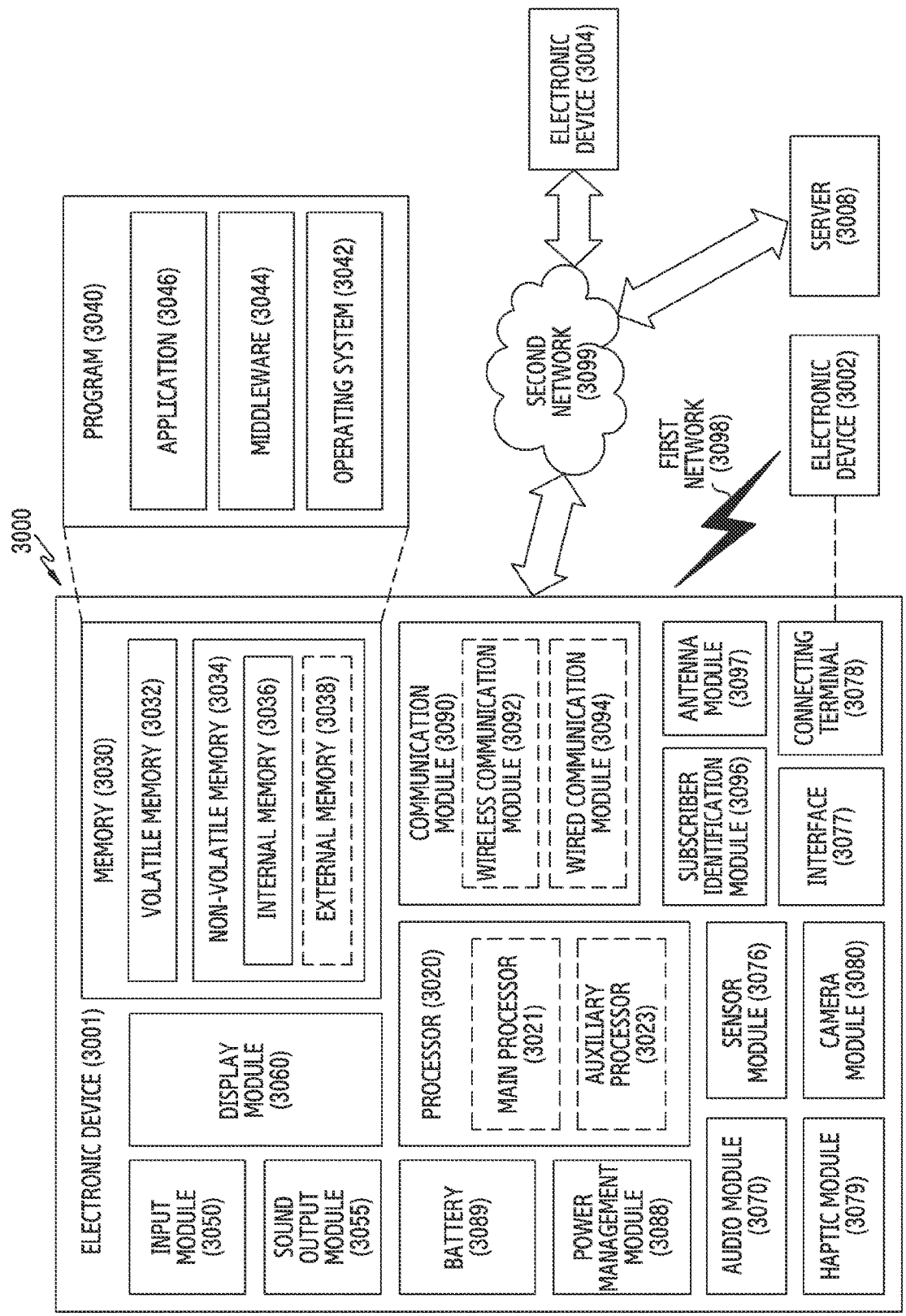
FIG. 30 is a block diagram illustrating an electronic device in a network environment, according to an embodiment.

FIG. 30 is a block diagram illustrating an electronic device 3001 in a network environment 3000, according to an embodiment. The electronic device 3001 in the network environment 3000 may communicate with an electronic device 3002 via a first network 3098 (e.g., a short-range wireless communication network), or at least one of an electronic device 3004 or a server 3008 via a second network 3099 (e.g., a long-range wireless communication network). The electronic device 3001 may communicate with the electronic device 3004 via the server 3008. The electronic device 3001 may include a processor 3020, memory 3030, an input module 3050, a sound output module 3055, a display module 3060, an audio module 3070, a sensor module 3076, an interface 3077, a connecting terminal 3078, a haptic module 3079, a camera module 3080, a power management module 3088, a battery 3089, a communication module 3090, a subscriber identification module (SIM) 3096, or an antenna module 3097. In some embodiments, at least one of the components (e.g., the connecting terminal 3078) may be omitted from the electronic device 3001, or one or more other components may be added in the electronic device 3001. In some embodiments, some of the components (e.g., the sensor module 3076, the camera module 3080, or the antenna module 3097) may be implemented as a single component (e.g., the display module 3060).

The processor 3020 may execute, for example, software (e.g., a program 3040) to control at least one other component (e.g., a hardware or software component) of the electronic device 3001 coupled with the processor 3020, and may perform various data processing or computation. As at least part of the data processing or computation, the processor 3020 may store a command or data received from another component (e.g., the sensor module 3076 or the communication module 3090) in volatile memory 3032, process the command or the data stored in the volatile memory 3032, and store resulting data in non-volatile memory 3034. The processor 3020 may include a main processor 3021 (e.g., a central processing unit (CPU) or an application processor (AP)), or an auxiliary processor 3023 (e.g., a graphics processing unit (GPU), a neural processing unit (NPU), an image signal processor (ISP), a sensor hub processor, or a communication processor (CP)) that is operable independently from, or in conjunction with, the main processor 3021. For example, when the electronic device 3001 includes the main processor 3021 and the auxiliary processor 3023, the auxiliary processor 3023 may be adapted to consume less power than the main processor 3021, or to be specific to a specified function. The auxiliary processor 3023 may be implemented as separate from, or as part of the main processor 3021.

The auxiliary processor 3023 may control at least some of functions or states related to at least one component (e.g., the display module 3060, the sensor module 3076, or the communication module 3090) among the components of the electronic device 3001, instead of the main processor 3021 while the main processor 3021 is in an inactive (e.g., sleep) state, or together with the main processor 3021 while the main processor 3021 is in an active state (e.g., executing an application). The auxiliary processor 3023 (e.g., an image signal processor or a communication processor) may be implemented as part of another component (e.g., the camera module 3080 or the communication module 3090) functionally related to the auxiliary processor 3023. The auxiliary processor 3023 (e.g., the neural processing unit) may include a hardware structure specified for artificial intelligence model processing. An artificial intelligence model may be generated by machine learning. Such learning may be performed, e.g., by the electronic device 3001 where the artificial intelligence is performed or via a separate server (e.g., the server 3008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 3030 may store various data used by at least one component (e.g., the processor 3020 or the sensor module 3076) of the electronic device 3001. The various data may include, for example, software (e.g., the program 3040) and input data or output data for a command related thereto. The memory 3030 may include the volatile memory 3032 or the non-volatile memory 3034.

The program 3040 may be stored in the memory 3030 as software, and may include, for example, an operating system (OS) 3042, middleware 3044, or an application 3046.

The input module 3050 may receive a command or data to be used by another component (e.g., the processor 3020) of the electronic device 3001, from the outside (e.g., a user) of the electronic device 3001. The input module 3050 may include, for example, a microphone, a mouse, a keyboard, a key (e.g., a button), or a digital pen (e.g., a stylus pen).

The sound output module 3055 may output sound signals to the outside of the electronic device 3001. The sound output module 3055 may include, for example, a speaker or a receiver. The speaker may be used for general purposes, such as playing multimedia or playing record. The receiver may be used for receiving incoming calls. The receiver may be implemented as separate from, or as part of the speaker.

The display module 3060 may visually provide information to the outside (e.g., a user) of the electronic device 3001. The display module 3060 may include, for example, a display, a hologram device, or a projector and control circuitry to control a corresponding one of the display, hologram device, and projector. The display module 3060 may include a touch sensor adapted to detect a touch, or a pressure sensor adapted to measure the intensity of force incurred by the touch.

The audio module 3070 may convert a sound into an electrical signal and vice versa. The audio module 3070 may obtain the sound via the input module 3050, or output the sound via the sound output module 3055 or a headphone of an external electronic device (e.g., an electronic device 3002) directly (e.g., wiredly) or wirelessly coupled with the electronic device 3001.

The sensor module 3076 may detect an operational state (e.g., power or temperature) of the electronic device 3001 or an environmental state (e.g., a state of a user) external to the electronic device 3001, and then generate an electrical signal or data value corresponding to the detected state. The sensor module 3076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 3077 may support one or more specified protocols to be used for the electronic device 3001 to be coupled with the external electronic device (e.g., the electronic device 3002) directly (e.g., wiredly) or wirelessly. The interface 3077 may include, for example, a high definition multimedia interface (HDMI), a universal serial bus (USB) interface, a secure digital (SD) card interface, or an audio interface.

A connecting terminal 3078 may include a connector via which the electronic device 3001 may be physically connected with the external electronic device (e.g., the electronic device 3002). The connecting terminal 3078 may include, for example, a HDMI connector, a USB connector, a SD card connector, or an audio connector (e.g., a headphone connector).

The haptic module 3079 may convert an electrical signal into a mechanical stimulus (e.g., a vibration or a movement) or electrical stimulus which may be recognized by a user via his tactile sensation or kinesthetic sensation. The haptic module 3079 may include, for example, a motor, a piezoelectric element, or an electric stimulator.

The camera module 3080 may capture a still image or moving images. The camera module 3080 may include one or more lenses, image sensors, image signal processors, or flashes.

The power management module 3088 may manage power supplied to the electronic device 3001. The power management module 3088 may be implemented as at least part of, for example, a power management integrated circuit (PMIC).

The battery 3089 may supply power to at least one component of the electronic device 3001. The battery 3089 may include, for example, a primary cell which is not rechargeable, a secondary cell which is rechargeable, or a fuel cell.

The communication module 3090 may support establishing a direct (e.g., wired) communication channel or a wireless communication channel between the electronic device 3001 and the external electronic device (e.g., the electronic device 3002, the electronic device 3004, or the server 3008) and performing communication via the established communication channel. The communication module 3090 may include one or more communication processors that are operable independently from the processor 3020 (e.g., the application processor (AP)) and supports a direct (e.g., wired) communication or a wireless communication. According to an embodiment, the communication module 3090 may include a wireless communication module 3092 (e.g., a cellular communication module, a short-range wireless communication module, or a global navigation satellite system (GNSS) communication module) or a wired communication module 3094 (e.g., a local area network (LAN) communication module or a power line communication (PLC) module). A corresponding one of these communication modules may communicate with the external electronic device via the first network 3098 (e.g., a short-range communication network, such as Bluetooth™, wireless-fidelity (Wi-Fi) direct, or infrared data association (IrDA)) or the second network 3099 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 3092 may identify and authenticate the electronic device 3001 in a communication network, such as the first network 3098 or the second network 3099, using subscriber information (e.g., international mobile subscriber identity (IMSI)) stored in the subscriber identification module 3096.

The wireless communication module 3092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 3092 may support a high-frequency band (e.g., the mmWave band) to achieve, e.g., a high data transmission rate. The wireless communication module 3092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 3092 may support various requirements specified in the electronic device 3001, an external electronic device (e.g., the electronic device 3004), or a network system (e.g., the second network 3099). According to an embodiment, the wireless communication module 3092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 3097 may transmit or receive a signal or power to or from the outside (e.g., the external electronic device) of the electronic device 3001. According to an embodiment, the antenna module 3097 may include an antenna including a radiating element composed of a conductive material or a conductive pattern formed in or on a substrate (e.g., a printed circuit board (PCB)). According to an embodiment, the antenna module 3097 may include a plurality of antennas (e.g., array antennas). In such a case, at least one antenna appropriate for a communication scheme used in the communication network, such as the first network 3098 or the second network 3099, may be selected, for example, by the communication module 3090 (e.g., the wireless communication module 3092) from the plurality of antennas. The signal or the power may then be transmitted or received between the communication module 3090 and the external electronic device via the selected at least one antenna. According to an embodiment, another component (e.g., a radio frequency integrated circuit (RFIC)) other than the radiating element may be additionally formed as part of the antenna module 3097.

The antenna module 3097 may form a mmWave antenna module. The mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 3001 and the external electronic device 3004 via the server 3008 coupled with the second network 3099. Each of the electronic devices 3002 or 3004 may be a device of a same type as, or a different type, from the electronic device 3001. All or some of operations to be executed at the electronic device 3001 may be executed at one or more of the external electronic devices 3002, 3004, or 3008. For example, if the electronic device 3001 should perform a function or a service automatically, or in response to a request from a user or another device, the electronic device 3001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 3001. The electronic device 3001 may provide the outcome, with or without further processing of the outcome, as at least part of a reply to the request. To that end, a cloud computing, distributed computing, mobile edge computing (MEC), or client-server computing technology may be used, for example. The electronic device 3001 may provide ultra low-latency services using, e.g., distributed computing or mobile edge computing. In another embodiment, the external electronic device 3004 may include an internet-of-things (IoT) device. The server 3008 may be an intelligent server using machine learning and/or a neural network. The external electronic device 3004 or the server 3008 may be included in the second network 3099. The electronic device 3001 may be applied to intelligent services (e.g., smart home, smart city, smart car, or healthcare) based on 5G communication technology or IoT-related technology.

Figure 31:
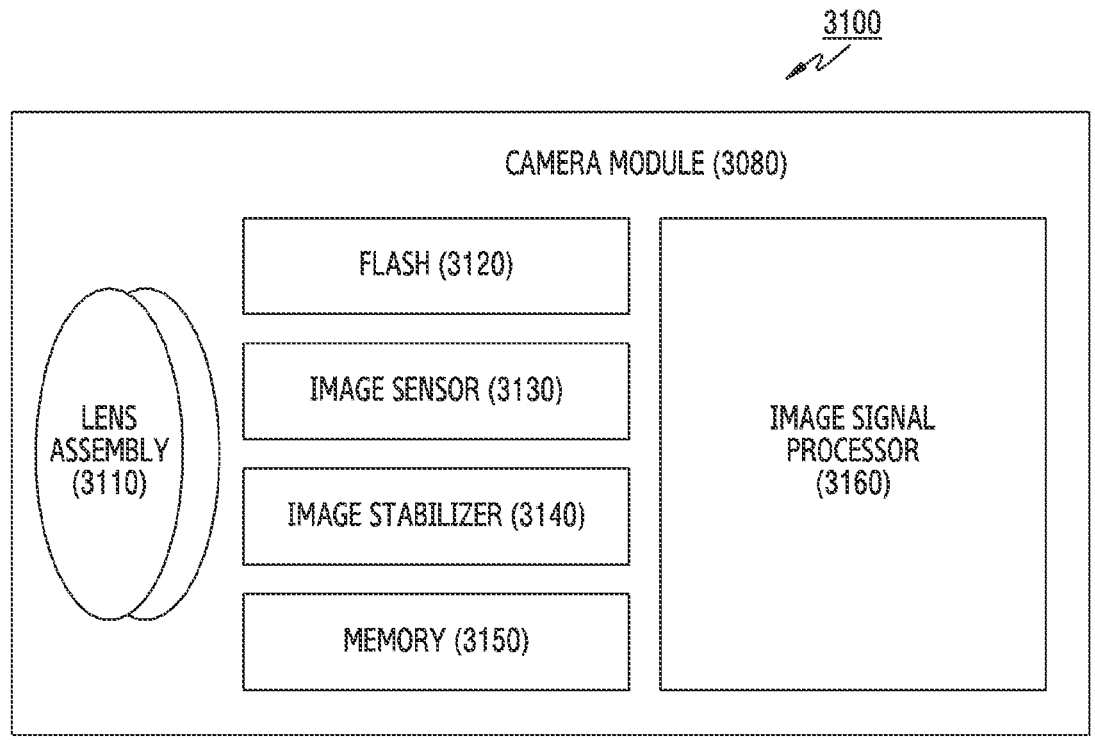
FIG. 31 is a block diagram illustrating a camera module, according to an embodiment.

FIG. 31 is a block diagram 3100 illustrating the camera module 3080, according to an embodiment. The camera module 3080 includes a lens assembly 3110, a flash 3120, an image sensor 3130, an image stabilizer 3140, a memory 3150 (e.g., buffer memory), and an image signal processor 3160. The lens assembly 3110 may collect light emitted or reflected from an object whose image is to be taken. The lens assembly 3110 may include one or more lenses. The camera module 3080 may include a plurality of lens assemblies 3110. In such a case, the camera module 3080 may form, for example, a dual camera, a 360-degree camera, or a spherical camera. Some of the plurality of lens assemblies 3110 may have the same lens attribute (e.g., view angle, focal length, auto-focusing, f number, or optical zoom), or at least one lens assembly may have one or more lens attributes different from those of another lens assembly. The lens assembly 3110 may include, for example, a wide-angle lens or a telephoto lens.

The flash 3120 may emit light that is used to reinforce light reflected from an object. The flash 3120 may include one or more light emitting diodes (LEDs) (e.g., a red-green-blue (RGB) LED, a white LED, an infrared (IR) LED, or an ultraviolet (UV) LED) or a xenon lamp. The image sensor 3130 may obtain an image corresponding to an object by converting light emitted or reflected from the object and transmitted via the lens assembly 3110 into an electrical signal. The image sensor 3130 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 3130 may be implemented using, for example, a charged coupled device (CCD) sensor or a complementary metal oxide semiconductor (CMOS) sensor.

The image stabilizer 3140 may move the image sensor 3130 or at least one lens included in the lens assembly 3110 in a particular direction, or control an operational attribute (e.g., adjust the read-out timing) of the image sensor 3130 in response to the movement of the camera module 3080 or the electronic device 3001 including the camera module 3080. This allows for compensating for at least part of a negative effect (e.g., image blurring) by the movement on an image being captured. The image stabilizer 3140 may sense such a movement by the camera module 3080 or the electronic device 3001 using a gyro sensor or an acceleration sensor disposed inside or outside the camera module 3080. The image stabilizer 3140 may be implemented, for example, as an optical image stabilizer.

The memory 3150 may store, at least temporarily, at least part of an image obtained via the image sensor 3130 for a subsequent image processing task. For example, if image capturing is delayed due to shutter lag or multiple images are quickly captured, a raw image obtained (e.g., a Bayer-patterned image, a high-resolution image) may be stored in the memory 3150, and its corresponding copy image (e.g., a low-resolution image) may be previewed via the display module 3060. Thereafter, if a specified condition is met (e.g., by a user's input or system command), at least part of the raw image stored in the memory 3150 may be obtained and processed, for example, by the image signal processor 3160. The memory 3150 may be configured as at least part of the memory 3030 or as a separate memory that is operated independently from the memory 3030.

The image signal processor 3160 may perform one or more image processing with respect to an image obtained via the image sensor 3130 or an image stored in the memory 3150. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 3160 may perform control (e.g., exposure time control or read-out timing control) with respect to at least one (e.g., the image sensor 3130) of the components included in the camera module 3080. An image processed by the image signal processor 3160 may be stored back in the memory 3150 for further processing, or may be provided to an external component (e.g., the memory 3030, the display module 3060, the electronic device 3002, the electronic device 3004, or the server 3008) outside the camera module 3080. The image signal processor 3160 may be configured as at least part of the processor 3020, or as a separate processor that is operated independently from the processor 3020. If the image signal processor 3160 is configured as a separate processor from the processor 3020, at least one image processed by the image signal processor 3160 may be displayed, by the processor 3020, via the display module 3060 as it is or after being further processed.

The electronic device 3001 may include a plurality of camera modules 3080 having different attributes or functions. In such a case, at least one of the plurality of camera modules 3080 may form, for example, a wide-angle camera and at least another of the plurality of camera modules 3080 may form a telephoto camera. Similarly, at least one of the plurality of camera modules 3080 may form, for example, a front camera and at least another of the plurality of camera modules 3080 may form a rear camera.

According to an embodiment, an electronic device includes a first housing, and a second housing coupled to the first housing in a movable manner with respect to the first housing. The electronic device also includes a flexible display disposed on the first housing and the second housing, and having a structure that is changeable with a movement of the second housing. The electronic device also includes a camera module in which an optical magnification can be set, and a processor electrically coupled to the flexible display and the camera module. The camera module includes a first camera holder connected to the first housing and including a first lens module disposed along a first optical axis, and a second camera holder connected to the second housing and including at least a second lens module disposed along the first optical axis. The second camera holder is movable along the first optical axis with respect to the first camera holder with the movement of the second housing. The processor is configured to identify the movement of the second housing, identify an arrangement state of lens modules that satisfies the identified movement of the second housing and the optical magnification, and move the first lens module and the second lens module to be in the identified arrangement state.

The electronic device may further include a device extension sensing module. The processor may be further configured to detect the movement of the second housing or the flexible display by using the device extension sensing module, identify a size of an exposed area of the flexible display, based on the detected movement, and identify the arrangement state of lens modules that satisfies the identified size of the exposed area and the optical magnification.

The electronic device may change a structure of the camera module with a change in the size of the exposed area of the flexible display.

The electronic device may further include a memory. The memory may store data regarding the movement of the second housing and the arrangement state of lens modules that satisfies the optical magnification.

The first camera holder may be connected to the first housing through a first bracket. The second camera holder may be connected to the second housing through a second bracket.

The first bracket and the second bracket may be screwed to the first housing and the second housing, respectively.

The electronic device may have the second bracket including a buffer base. The buffer base may be in contact with the first bracket.

The processor may identify a length of the first camera holder and the second camera holder as a result of the movement of the second housing.

The processor may be configured to move the first lens module and the second lens module through at least one of a VCM scheme and a scheme of using a piezoelectric actuator.

The first lens module may be coupled to a first piezoelectric actuator. The second lens module may be coupled to a second piezoelectric actuator.

The processor may be configured to determine whether the camera module is in focus, re-adjust a position of the first lens module and second lens module in case that the camera module is not in focus, and obtain an image using the camera module in case that the camera module is in focus.

The camera module may further include a third camera holder between the first camera holder and the second camera holder. The third camera holder may be coupled to the first camera holder and the second camera holder in a movable manner with respect to the first camera holder and the second camera holder.

The processor may be configured to perform a zoom-in operation when a user obtains an input for extending the flexible display and perform a zoom-out operation when the user obtains an input for reducing the flexible display.

The processor may be configured to display a user interface allowing a user to perform a zoom-in or zoom-out operation through the flexible display.

The processor may be configured to provide a user interface associated with the optical magnification and a size of an exposed area of the flexible display.

According to another embodiment, an electronic device may include a first housing, and a second housing to the first housing in a movable manner with respect to the first housing. The electronic device also includes a flexible display disposed on the first housing and the second housing. A size of an exposed area of the flexible display that is visible from a front face of the electronic device is capable of being changed with a movement of the second housing. The electronic device further includes a camera module in which an optical magnification can be set. The camera module includes a first camera holder connected to the first housing and including a first lens module disposed along a first optical axis, and a second camera holder connected to the second housing and including at least a second lens module disposed along the first optical axis. The second camera holder is movable along the first optical axis with respect to the first camera holder with the movement of the second housing. The electronic device also includes a processor electrically coupled with the flexible display and the camera module. The processor is configured to identify a size of the exposed area of the flexible display, identify a first position corresponding to a current position of the second lens module and third lens module, identify a second position at which the second lens module and the third lens module satisfy a set optical magnification of the camera module, and move the second lens module and third lens module to the second position.

The electronic device may further include a device extension sensing module. The processor may be configured to detect a movement of the flexible display using the device extension sensing module, and identify a size of the exposed area, based on the detected movement.

The electronic device may further include a memory. The memory may store data regarding the second position at which the detected size of the exposed area and optical magnification are satisfied.

The processor may be configured to move the first lens module and the second lens module through at least one of a VCM scheme and a scheme of using a piezoelectric actuator.

The first lens module may be connected to a first piezoelectric actuator. The second lens module may be connected to a second piezoelectric actuator.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., an internal memory or external memory) that is readable by a machine (e.g., the electronic device). For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities, and some of the multiple entities may be separately disposed in different components. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain embodiments thereof, it will be understood by those skilled in the art that various changes in form and detail may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
   a first housing;
   a second housing coupled to the first housing in a movable manner with respect to the first housing;
   a flexible display disposed on the first housing and the second housing, and having a structure that is changeable with a movement of the second housing;
   a camera module in which an optical magnification can be set;
   memory storing instructions; and
   at least one processor wherein the camera module comprises:
      a first camera holder coupled to the first housing and comprising a first lens module disposed along a first optical axis; and
      a second camera holder coupled to the second housing and comprising at least a second lens module disposed along the first optical axis,
   wherein the second camera holder is coupled to the first camera holder in a mutually movable along the first optical axis with the movement of the second housing, and
   wherein the instructions, executed by the at least one processor, cause the electronic device to:
      identify the movement of the second housing;
      identify an arrangement state of lens modules that satisfies the identified movement of the second housing and the optical magnification; and
      move the first lens module and the second lens module to be in the identified arrangement state.

2. The electronic device of claim 1, further comprising a device extension sensing module,
   wherein the instructions, executed by the at least one processor, cause the electronic device to:
      detect the movement of the second housing or the flexible display using the device extension sensing module;
      identify a size of an exposed area of the flexible display, based on the detected movement; and
      identify the arrangement state of lens modules that satisfies the identified size of the exposed area and the optical magnification.

3. The electronic device of claim 2, wherein a structure of the camera module is changed with a change in the size of the exposed area of the flexible display.

4. The electronic device of claim 1, wherein the memory stores data regarding the movement of the second housing and the arrangement state of lens modules that satisfies the optical magnification.

5. The electronic device of claim 1, wherein
   the first camera holder is coupled to the first housing through a first bracket, and
   the second camera holder is coupled to the second housing through a second bracket.

6. The electronic device of claim 5, wherein the first bracket and the second bracket are screwed to the first housing and the second housing, respectively.

7. The electronic device of claim 5, wherein
   the second bracket includes a buffer base, and
   the buffer base is in contact with the first bracket.

8. The electronic device of claim 1, wherein the instructions, executed by the at least one processor, cause the electronic device to identify a length of the first camera holder and the second camera holder as result of the movement of the second housing.

9. The electronic device of claim 1, wherein the instructions, executed by the at least one processor, cause the electronic device to move the first lens module and the second lens module through at least one of a voice coil motor (VCM) scheme and a scheme of using a piezoelectric actuator.

10. The electronic device of claim 9, wherein:
    the first lens module is coupled to a first piezoelectric actuator, and
    the second lens module is coupled to a second piezoelectric actuator.

11. The electronic device of claim 1, wherein the instructions, executed by the at least one processor, cause the electronic device to:

determine whether the camera module is in focus;

re-adjust a position of the first lens module and second lens module, in case that the camera module is not in focus; and obtain an image using the camera module, in case that the camera module is in focus.

12. The electronic device of claim 1, wherein the camera module further includes a third camera holder between the first camera holder and the second camera holder, and the third camera holder is coupled to the first camera holder and the second camera holder in a movable manner with respect to the first camera holder and the second camera holder.

13. The electronic device of claim 1, wherein the instructions, executed by the at least one processor, cause the electronic device to:

in response to obtaining a user input for extending the flexible display, perform a zoom-in operation; and in response to obtaining a user input for reducing the flexible display, perform a zoom-out operation.

14. The electronic device of claim 1, wherein the instructions, executed by the at least one processor, cause the electronic device to display a user interface allowing a user to perform a zoom-in operation or zoom-out operation through the flexible display.

15. The electronic device of claim 1, wherein the instructions, executed by the at least one processor, cause the electronic device to provide a user interface associated with the optical magnification and a size of an exposed area of the flexible display.

16. An electronic device comprising:

a first housing;

a second housing coupled to the first housing in a movable manner with respect to the first housing;

a flexible display disposed on the first housing and the second housing, wherein a size of an exposed area of the flexible display that is visible from a front face of the electronic device is capable of being changed with a movement of the second housing;

a camera module in which an optical magnification can be set, wherein the camera module comprises:

a first camera holder coupled to the first housing and comprising a first lens module disposed along a first optical axis, and a second camera holder coupled to the second housing and comprising at least a second lens module disposed along the first optical axis, wherein the second camera holder is coupled to the first camera holder in a mutually movable along the first optical axis with the movement of the second housing; and memory storing instructions; and at least one processor, wherein the instructions, executed by the at least one processor, cause the electronic device to;

identify a size of the exposed area of the flexible display;

identify a first position corresponding to a current position of the first lens module and the second lens module;

identify a second position at which the first lens module and the second lens module satisfy a set optical magnification of the camera module; and move the first lens module and second lens module to the second position.

17. The electronic device of claim 16, further comprising a device extension sensing module, wherein the instructions, executed by the at least one processor, cause the electronic device to:

detect a movement of the flexible display using the device extension sensing module; and identify a size of the exposed area, based on the detected movement.

18. The electronic device of claim 17, wherein the memory stores data regarding the second position at which the detected size of the exposed area and optical magnification are satisfied.

19. The electronic device of claim 17, wherein the instructions, executed by the at least one processor, cause the electronic device to move the first lens module and the second lens module through at least one of a voice coil motor (VCM) scheme and a scheme of using a piezoelectric actuator.

20. The electronic device of claim 16, wherein:

the first lens module is coupled to a first piezoelectric actuator, and the second lens module is coupled to a second piezoelectric actuator.

* * * * *